(12) United States Patent
Schmidt et al.

(10) Patent No.: US 9,375,947 B2
(45) Date of Patent: *Jun. 28, 2016

(54) ELECTRICAL-ASSIST FOR MECHANICAL BRAILLE WRITER AND STOPPER

(71) Applicant: Perkins School for the Blind, Watertown, MA (US)

(72) Inventors: Michael Schmidt, Bedford, MA (US); Jude Jonas, Waltham, MA (US)

(73) Assignee: PERKINS SCHOOL FOR THE BLIND, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,731

(22) Filed: Jul. 29, 2014

(65) Prior Publication Data

US 2014/0334861 A1    Nov. 13, 2014

Related U.S. Application Data

(62) Division of application No. 13/204,394, filed on Aug. 5, 2011, now Pat. No. 8,821,049.

(60) Provisional application No. 61/390,139, filed on Oct. 5, 2010.

(51) Int. Cl.
  *B41J 3/32* (2006.01)
  *G06F 3/02* (2006.01)

(52) U.S. Cl.
  CPC .... *B41J 3/32* (2013.01); *G06F 3/02* (2013.01)

(58) Field of Classification Search
  CPC .................................. B41J 3/32; G09B 21/02
  See application file for complete search history.

(56) References Cited

U.S. PATENT DOCUMENTS

| | | | |
|---|---|---|---|
| 2,680,507 A | 6/1954 | Frey et al. | |
| 2,891,649 A | 6/1959 | Peterson | |
| 3,032,164 A | 5/1962 | Watari | |
| 3,254,750 A | 6/1966 | Goldner | |
| 3,895,704 A * | 7/1975 | Norris | B41J 5/42 400/5 |
| 4,265,557 A | 5/1981 | Runge | |
| 5,324,011 A * | 6/1994 | Vilches et al. | 267/156 |
| 5,862,446 A * | 1/1999 | Hashizume et al. | 399/367 |
| 5,900,829 A * | 5/1999 | Gardner et al. | 341/26 |
| 6,392,516 B1 * | 5/2002 | Ward et al. | 335/255 |

(Continued)

OTHER PUBLICATIONS

US Notice of Allowance for U.S. Appl. No. 13/204,394 dated May 30, 2014.

(Continued)

*Primary Examiner* — Daniel J Colilla
(74) *Attorney, Agent, or Firm* — Daniel Rose; Foley & Lardner LLP

(57) ABSTRACT

An electrically-assisted mechanical Braille writer includes a main solenoid to apply force to emboss Braille onto a printing medium, and advance an embossing mechanism to the next cell. A second solenoid engages a mechanical stop to prevent one or more embossing keys from being fully depressed, to prevent kickback from the keys mechanically coupling to the main solenoid. In unpowered operation, the mechanical stop is disengaged, and the embossing keys may be fully depressed to apply force to emboss Braille and advance the embossing mechanism. Accordingly, with electrical power, the user may supply a lesser amount of force and still fully emboss Braille cells, while without electrical power, the Braille writer remains fully operational.

10 Claims, 21 Drawing Sheets

(56) References Cited

U.S. PATENT DOCUMENTS

2010/0226679 A1    9/2010    Okamoto et al.
2012/0009549 A1    1/2012    Morgan et al.

OTHER PUBLICATIONS

US Office Action for U.S. Appl. No. 13/204,394 dated Oct. 29, 2013.
US Office Action for U.S. Appl. No. 13/204,394 dated Mar. 14, 2014.

* cited by examiner

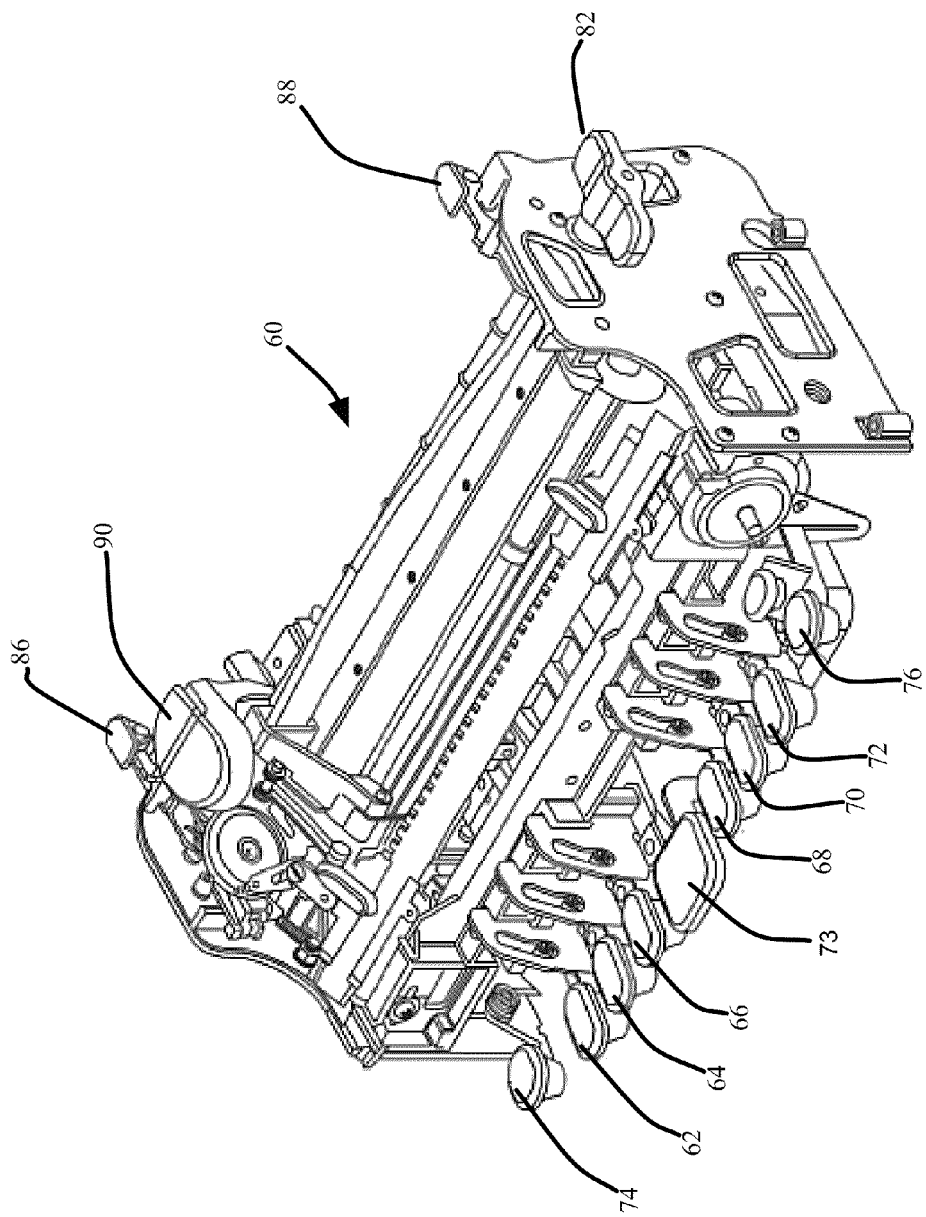

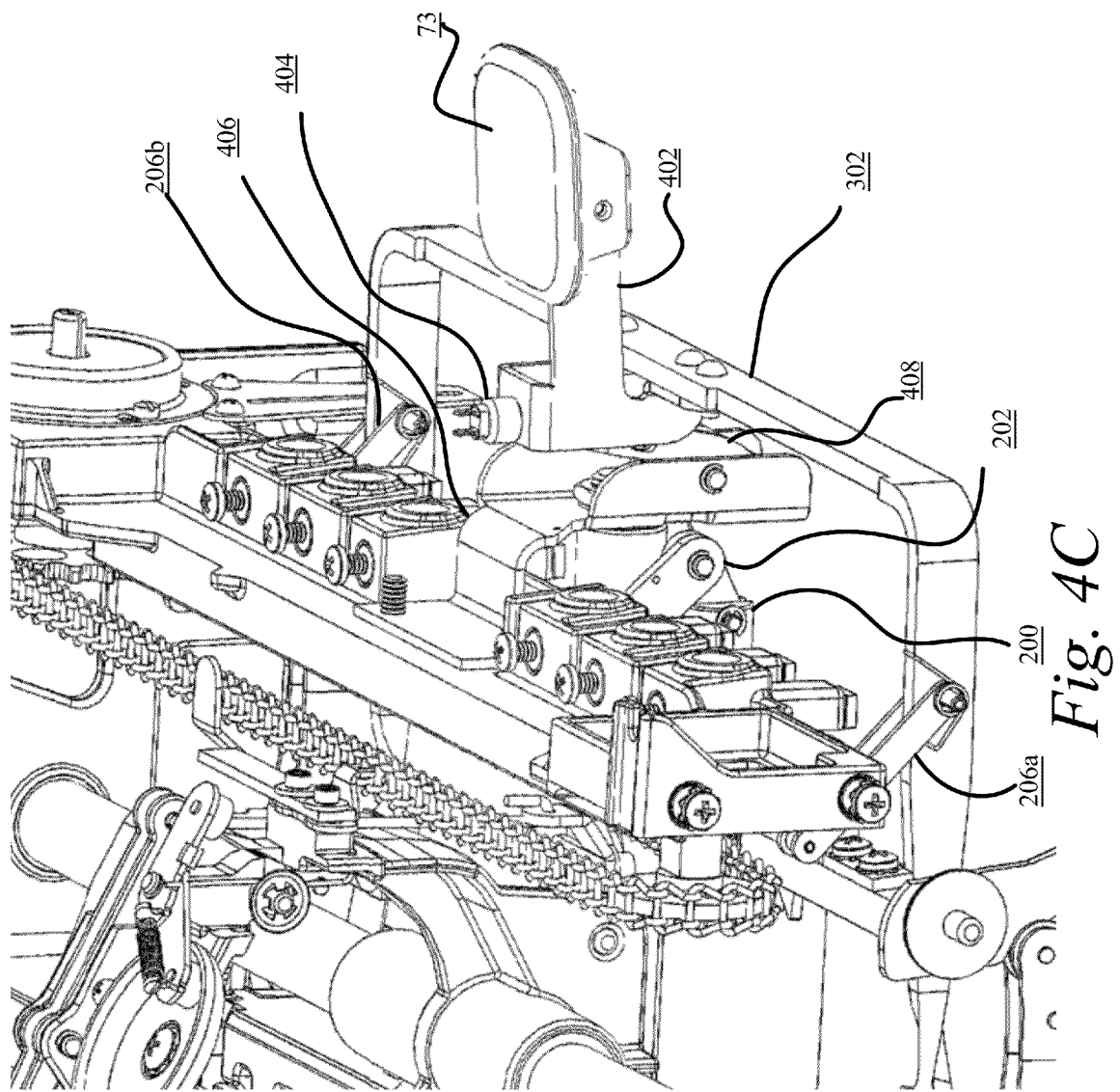

ELECTRICAL-ASSIST FOR MECHANICAL BRAILLE WRITER AND STOPPER

RELATED APPLICATIONS

Rack bar linkages 205a and 205b, referred to generally as rack bar linkage(s)205 or second linkage(s), may comprise L-shaped or T-shaped metal brackets connected to the horizontal bar attached to carriage spacer 204, with a profile allowing the rack bar linkages to engage or be engaged by rollers of sliding levers 206.

FIELD OF THE INVENTION

The present disclosure relates to methods and systems for writing and embossing with Braille. In particular, the present disclosure relates to an electrical assist system for a mechanical Braille writer.

BACKGROUND OF THE INVENTION

Braille was invented more than 175 years ago to provide a system that blind people can use to read and write. Braille is a system of raised dots that can be read very quickly with the fingers. Braille embossing involves pressing one or more pins of a set of blunted embossing pins arranged in a Braille cell into a printing medium, such as a sheet of heavy paper, to stretch the printing medium and create a corresponding one or more raised dots. Early manual systems for writing in Braille included a slate with holes arranged in rows of Braille cells and means for securing a piece of paper to the slate, and a blunted awl or stylus which was pressed into the paper to create the raised dot or dots, using the holes in the slate as a guide. Later, mechanical impact printers or Braille embossers were created to increase speed and efficiency of embossing, the first such embosser being the Perkins Brailler, originally manufactured in 1951 by the Perkins School for the Blind, based in Watertown, Mass. Currently, Braille writers exist in either mechanical or electronic formats. Examples of the former include the Braille Writer manufactured by the Perkins School for the Blind; the Tatrapoint and Jot-A-Dot writers manufactured by Quantum Technology of Rydalmere, Australia; the Erika Picht mechanical Braille writer manufactured by Blista-Brailletec gGmbH of Marburg, Germany; and the Lavender Braille Writer manufactured by American Printing House for the Blind, Inc. of Louisville, Ky. Examples of electronic Braille writers include the Mountbatten from Quantum Technology of Rydalmere, Australia.

Electronic Braille writers may be easy to use, requiring only a light touch. However, being based on electric switches and solenoids, electronic Braille writers require constant electrical power to operate. Accordingly, they may suffer from portability issues and may be less desirable in developing countries with intermittent or unreliable power. Mechanical Braille writers, on the other hand, may require more force to operate and be tougher to use, especially for young children. Furthermore, because the solenoids of electronic Braille writers may lock up and the sensors may fail to output signals in the absence of power, it may be difficult to combine both mechanical and electronic systems into a single Braille writer.

SUMMARY OF THE INVENTION

In one aspect, the present disclosure features an electrically-assisted mechanical Braille writer with an automatically-disengaging electrical assist. This mechanism combines the reliability and portability of mechanical writers with the ease of use of electronic writers. In unassisted operation, a user presses one or more embossing keys to raise pins of the embosser mechanism to emboss one or more dots of a Braille cell or a space key to advance the carriage, and upon release of the keys, the embossing mechanism is advanced. The user must press the keys a first predetermined distance, both to emboss the paper and to supply the energy to advance the embossing mechanism. The user may similarly press a backspace key, and upon release of the backspace key, the embossing mechanism is advanced backwards.

In assisted operation, the user presses the one or more keys a second, smaller predetermined distance. A mechanical switch, magnetic sensor, optical sensor, or other trigger detects the key press and engages a main solenoid, which lifts the embossing mechanism, supplying the energy for embossing the paper and advancing the embossing mechanism. To prevent a kickback from the solenoid from pressing the keys too far, in assisted operation, a second, latching solenoid engages a mechanical stop that prevents the one or more keys from being pushed to the larger first predetermined distance.

Accordingly, with electrical power, the user may supply a lesser amount of force and still fully emboss Braille cells, while without electrical power, the Braille writer remains fully operational.

In one aspect, the present application is directed to an electrical assist apparatus for a mechanical Braille writer. The electrical assist apparatus includes a first solenoid, attached to an embossing mechanism of a mechanical Braille writer. The electrical assist apparatus also includes a first linkage, attached to the embossing mechanism. The electrical assist apparatus further includes a second linkage, attached to a user-operated lever of the mechanical Braille writer, the second linkage oriented to engage the first linkage and offset from the first linkage by a first predetermined distance.

In some embodiments, the electrical assist apparatus further comprises a switch for engaging the first solenoid to emboss a Braille cell, the switch triggered when the second linkage is moved a second predetermined distance less than the first predetermined distance. In a further embodiment, the switch is triggered via a user-operated lever of the mechanical Braille writer being moved to a third predetermined distance. In another further embodiment, the electrical assist apparatus comprises a mechanical stop for preventing the second linkage from being moved beyond the second predetermined distance.

In a still further embodiment, the electrical assist apparatus comprises a second solenoid attached to the mechanical stop, the second solenoid moving the mechanical stop to a first predetermined position to prevent a user-operated lever of the mechanical Braille writer from being moved beyond a third predetermined distance to cause the second linkage to move beyond the second predetermined distance. In a still yet further embodiment, the electrical assist apparatus comprises a spring attached to the mechanical stop, the spring moving the mechanical stop to a second predetermined position in which the user-operated lever is not prevented from moving beyond the third predetermined distance.

In some embodiments, the first solenoid attached to the embossing mechanism further comprises an articulated arm attached to the first solenoid and the embossing mechanism. In many embodiments, the second linkage comprises one of a sliding lever, hook, catch, ring, and chain.

In another aspect, the present application is directed to a stopping mechanism for an electrical assist apparatus for a mechanical Braille writer. The stopping mechanism includes a mechanical stop. The stopping mechanism also includes a first solenoid attached to the mechanical stop that, when engaged, moves the mechanical stop to a first predetermined position to prevent a user-operated lever of a mechanical Braille writer from being moved beyond a first predetermined distance. The stopping mechanism further includes a spring attached to the mechanical stop, the spring moving the mechanical stop when the first solenoid is disengaged to a second predetermined position in which the user-operated lever is not prevented from moving beyond the first predetermined distance to a second predetermined distance.

In some embodiments, the stopping mechanism includes a switch attached to one of the mechanical stop, the first linkage, the second linkage, and the user-operated lever, the switch triggered to engage a second solenoid to cause an embossing mechanism of the mechanical Braille writer to emboss a Braille cell. In a further embodiment, the switch is triggered when the user-operated lever is moved to the first predetermined distance when the first solenoid is engaged. In another further embodiment, the switch is not triggered when the user operated lever is moved to the first predetermined distance when the first solenoid is not engaged.

In one embodiment, the first solenoid comprises a latching solenoid. In another embodiment, the stopping mechanism includes a first linkage connected to the user-operated lever, and a second linkage, oriented to engage the first linkage and offset from the first linkage by a third predetermined distance. In a further embodiment, the second linkage is moved to engage the first linkage when the user-operated lever is moved to the second predetermined distance.

The details of various embodiments of the invention are set forth in the accompanying drawings and the description below.

BRIEF DESCRIPTION OF THE DRAWINGS

FIG. 1D is a perspective view, with cover removed, of an embodiment of a mechanical Braille writer;

FIG. 4C is another perspective view of the mechanical stop shown in FIG. 4A as installed in a mechanical Braille writer having an electrical assist mechanism;

Figure 1A:
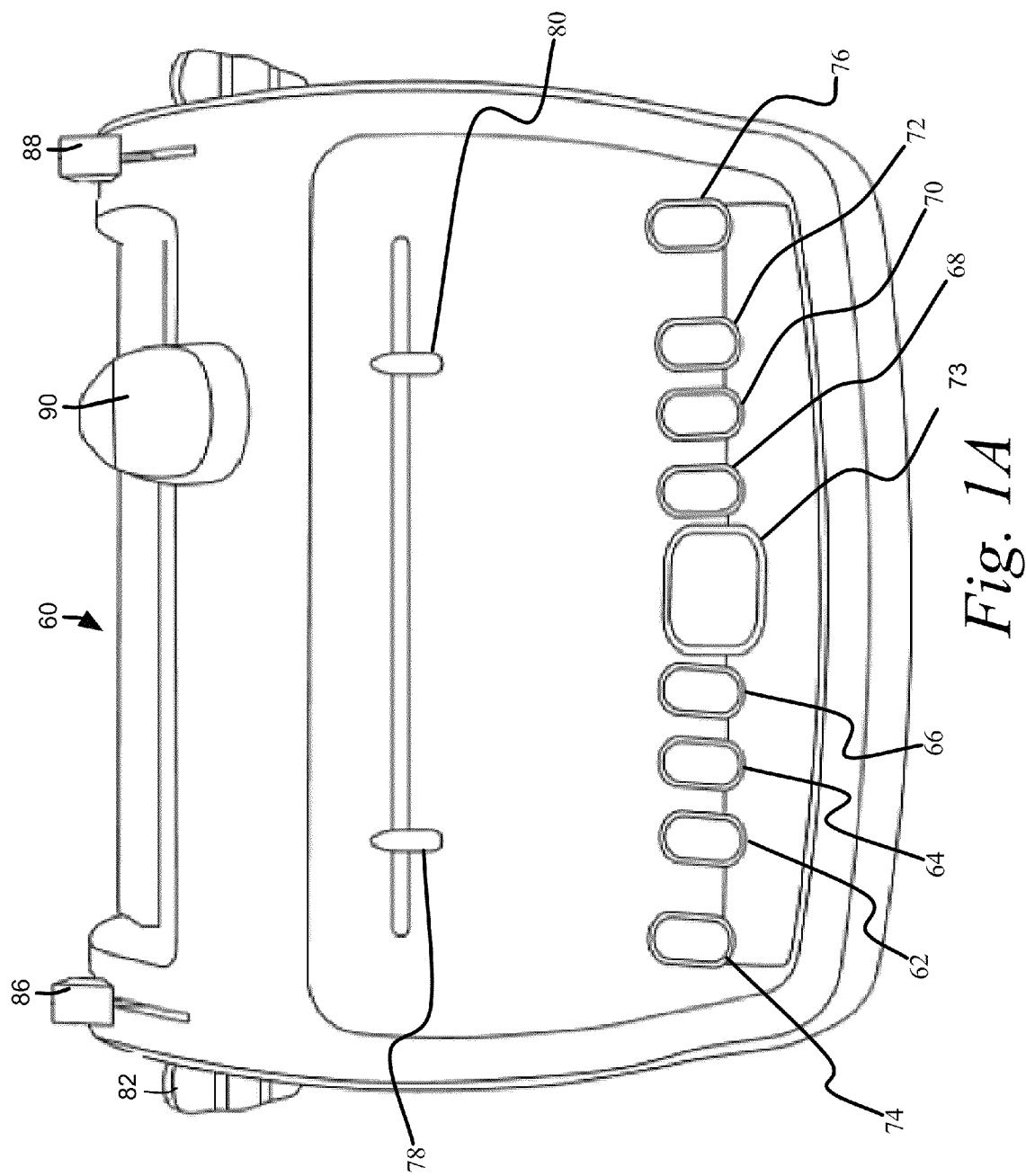
FIG. 1A is a perspective view of an embodiment of a mechanical Braille writer.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Illustrated in FIGS. 1A-1F are embodiments of a mechanical Braille writer 60. As shown in FIG. 1A, in one embodiment, the mechanical Braille writer 60 includes embossing keys 62, 64, 66, 68, 70, and 72, a space key 73, a line spacing key 74, and a back space key 76. In some embodiments, the mechanical Braille writer 60 includes margin guides 78 and 80 at the front of the Braille writer 60. In other embodiments, margin guides 78 and 80 may be attached to or incorporated within a top cover assembly of the mechanical Braille writer. Thus, although visible in the embodiments illustrated in FIGS. 1D and 1E, in other embodiments, margin guides 78 and 80 may be removed when a top cover assembly of the mechanical Braille writer is removed. In many embodiments, the Braille writer 60 includes paper advance knobs 82 and 84, which may comprise a "wingnut" configuration for ease of gripping. In some embodiments, Braille writer 60 may also include paper release levers 86 and 88. In one embodiment, Braille writer 60 may include an embossing mechanism or carriage assembly 90. In many embodiments, a front portion 91 of the Braille writer 60 may serve as an integrated handle.

Figure 1B:
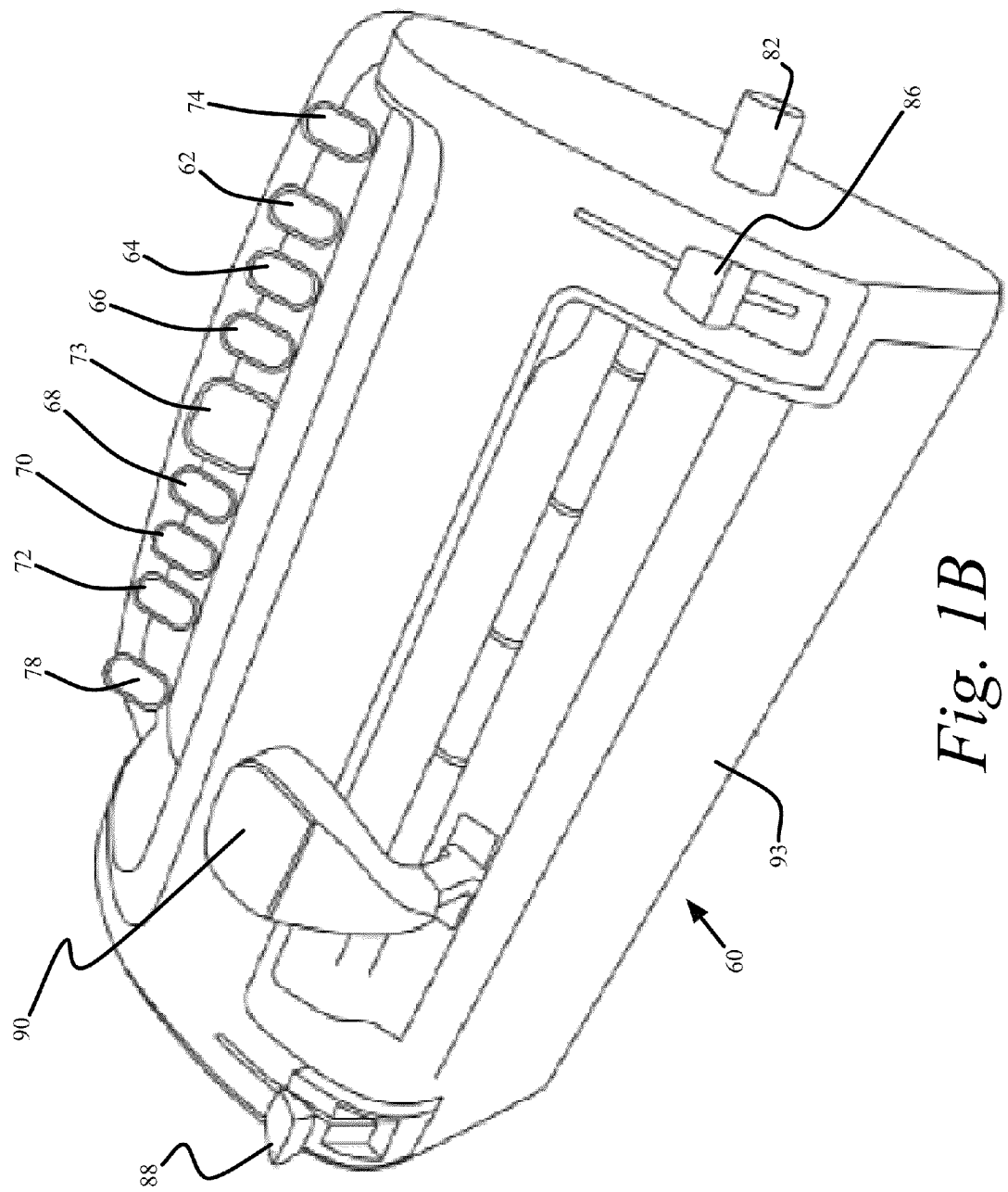
FIG. 1B is a perspective, rear view of an embodiment of a mechanical Braille writer.

Referring now to FIG. 1B, a Braille writer 60 may also include a moveable panel 93, which may serve as an integrated paper tray, reading rest and alignment surface. Moveable panel 93 may, in some embodiments, be rotated or pivoted via a hinge at an upper end of panel 93 to serve as a paper tray, reading rest, or alignment surface. In some embodiments, moveable panel 93 may include a latch, stand, lock, prop, or other mechanism for holding moveable panel 93 in an upright position. Moveable panel 93 may also include a latch for keeping moveable panel 93 closed when the Braille writer is carried.

Figure 1C:
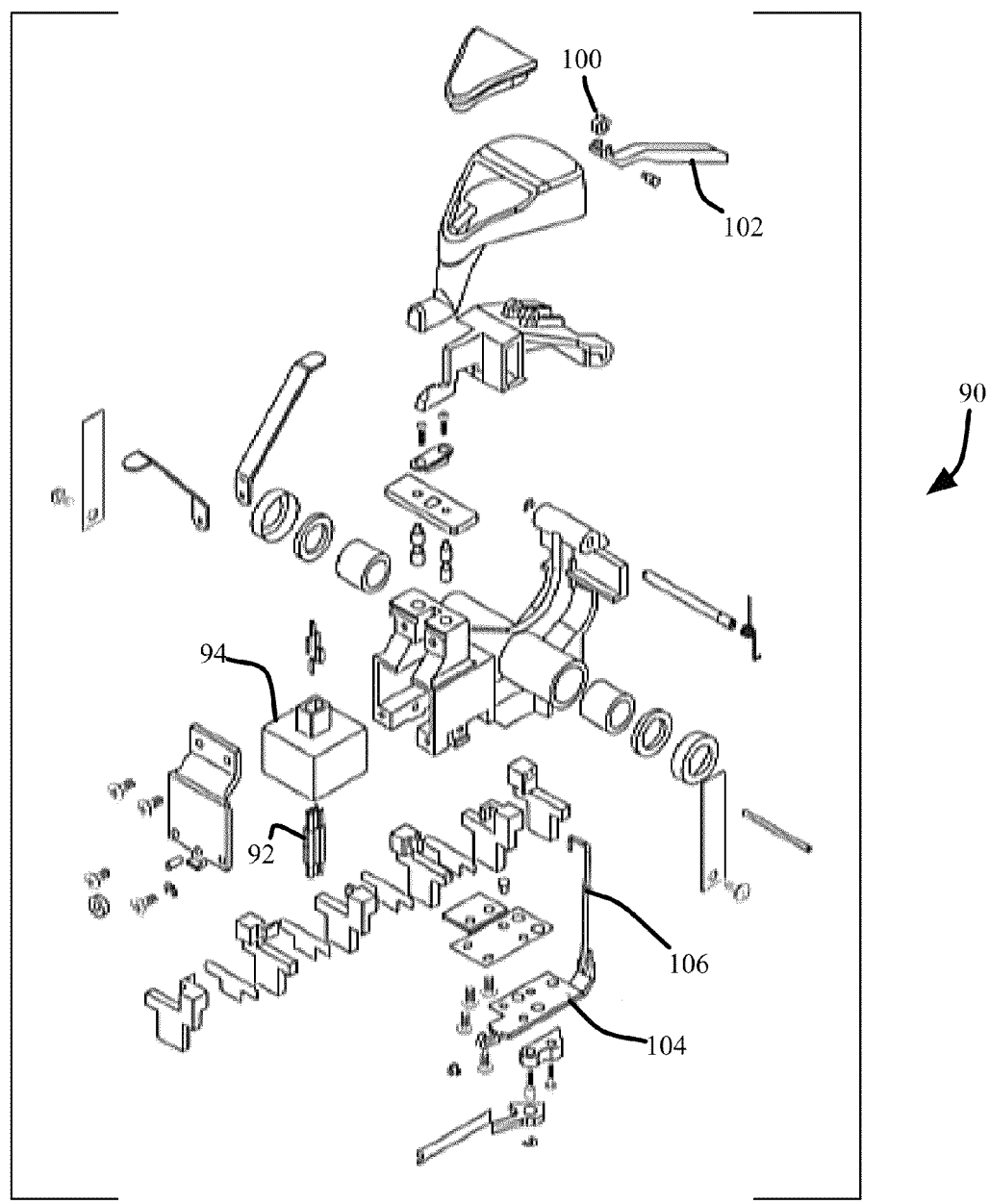
FIG. 1C is an exploded, perspective view of an embodiment of a mechanical embossing mechanism.

Referring now to FIG. 1C, one embodiment of an embossing mechanism or carriage assembly 90 includes an array of pins 92 and a guide block or structure 94. In some embodiments, the array of pins 92 may comprise six pins, while in other embodiments, other numbers of pins may be provided. For example, in some Braille writing systems, cells may include up to eight dots rather than six. Accordingly, in embodiments of the embossing mechanism for use in these Braille writing systems, there may be eight pins 92. In the embodiment illustrated in FIG. 1C, the pins in the array of pins 92 are straight and identical to one another, allowing for ease of assembly and adjustment. The pins may be slidingly guided by guide block 94. In other embodiments, the pins may be bent, or be bent with straight portions guided by guide block 94. Each pin 92 may be lifted by a corresponding lifter segment arranged from the front of the Braille writer to the back and shown below pins 92 in FIG. 1C.

Still referring to FIG. 1C, also shown is a carriage head release mechanism. A button 100 may be pushed downwardly onto a beam 102. The beam 102 then lifts a cell spacer assembly 104 by means of a hooked wire 106. Thus, pushing the button 100 results in the lifting of the cell spacer assembly 104 away from the rack bar thereby releasing the carriage.

In operation, a user may depress one of the embossing keys 62-72, causing a corresponding one of the pins in the array 92 to extend so as to emboss a raised dot on paper (not shown) passing between surfaces of the embossing mechanism 90. After a letter is created, the user activates a spacebar 73 to prepare for embossing a next letter. In another embodiment, spacebar 73 may be mechanically linked to embossing keys 62-72 such that upon release of all depressed embossing keys 62-72, the embossing mechanism 90 is moved to the next Braille cell.

Figure 1E:
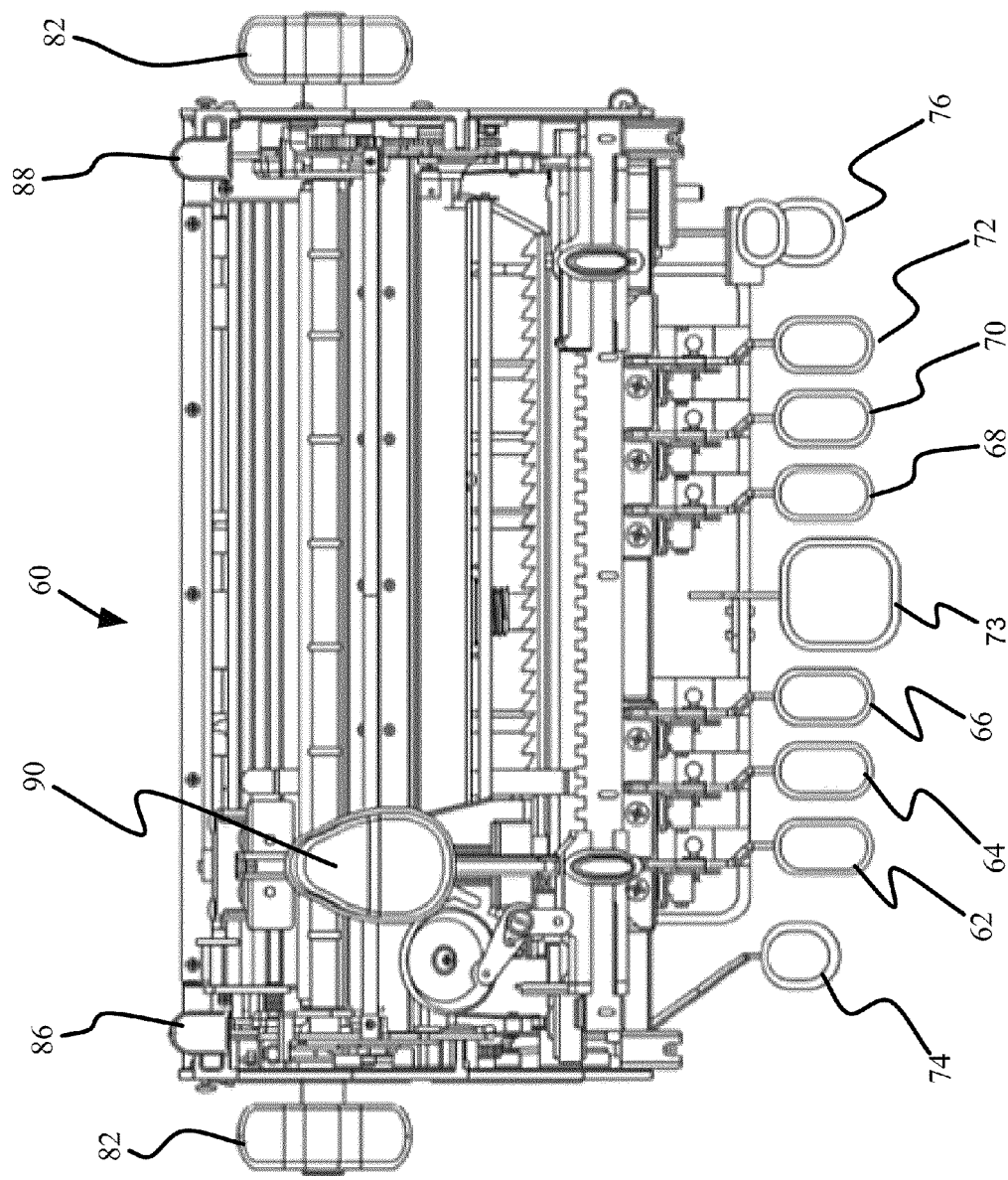
FIG. 1E is a top view, with cover removed, of an embodiment of a mechanical Braille writer with its cover removed.
Figure 1F:
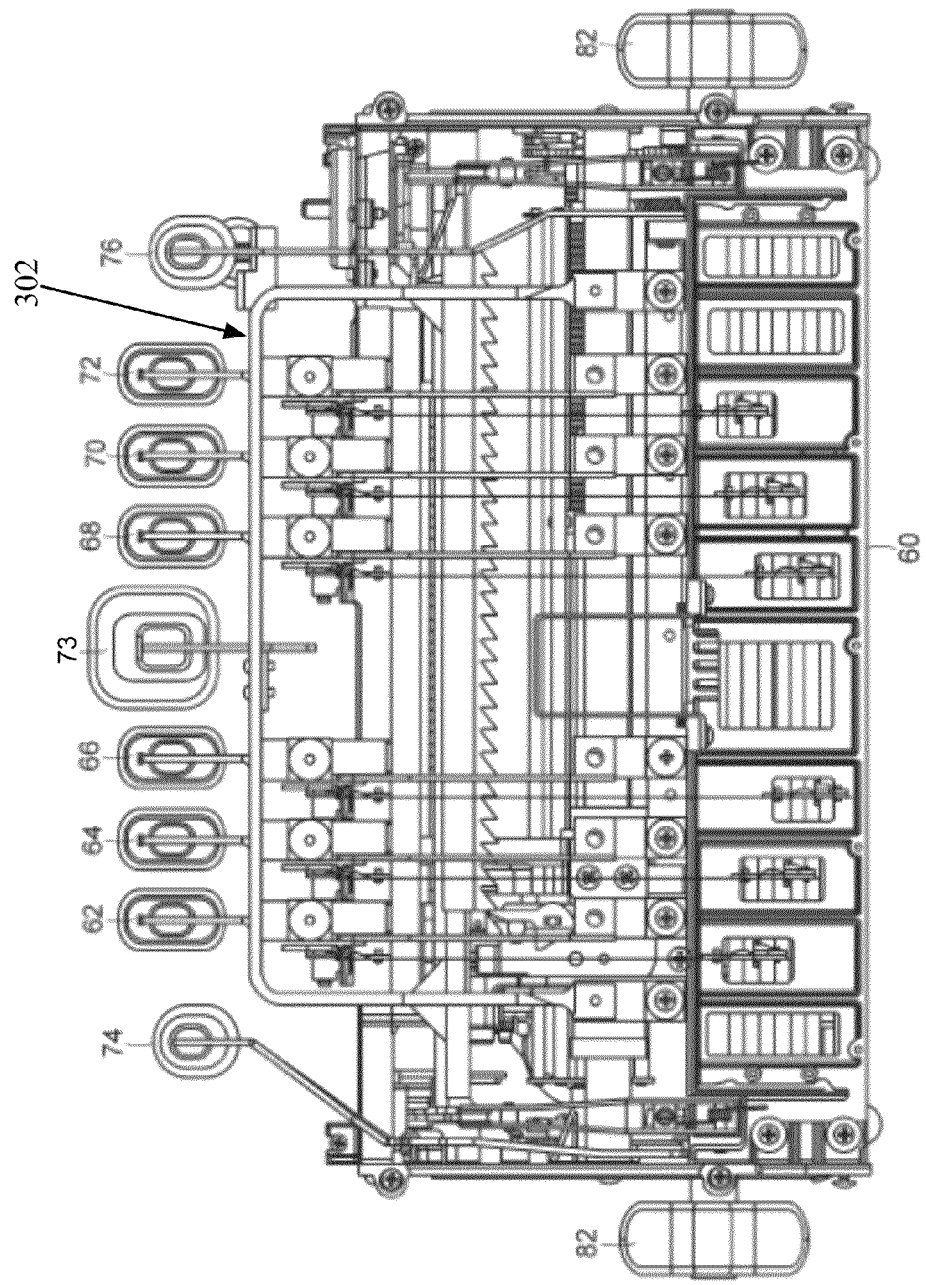
FIG. 1F is a bottom view of an embodiment of a mechanical Braille writer.

FIGS. 1D, 1E and 1F illustrate cutaway views of embodiments of a mechanical Braille writer, showing the mechanical interconnections that enable embossing. As shown in FIG. 1E, in some embodiments, a Braille writer 60 may include a paper drum assembly. Referring now to FIG. 1F which shows a cutaway view from below Braille writer 60, embossing keys 62-72 are connected via levers to a plurality of bars running horizontally across the Braille writer 60. Depressing a key rotates the corresponding lever, and accordingly raises the corresponding horizontal bar. Each of the plurality of bars correspond to the plurality of lifter segments shown in FIG. 1C, such that lifting the bar raises the lifter segment of the embosser head and the corresponding pin, no matter where across a page the embosser head is stationed.

As discussed above, in some embodiments in unassisted operation, a user presses one or more embossing keys to raise pins of the embosser mechanism to emboss one or more dots of a Braille cell or a space key to advance the carriage, and upon release of the keys, the embossing mechanism is advanced. In these embodiments, the user must press the keys a first predetermined distance, both to emboss the paper and to supply the energy to advance the embossing mechanism. The user may similarly press a backspace key, and upon release of the backspace key, the embossing mechanism is advanced backwards.

In some embodiments of assisted operation, the user presses the one or more keys a second, smaller predetermined distance. As used herein, first and second are intended only to illustrate relative terms, and as such, may be used interchangeably. In one such embodiment, a mechanical switch, magnetic sensor, optical sensor, or other trigger detects the key press and engages a main solenoid, which lifts the embossing mechanism, supplying the energy for embossing the paper and advancing the embossing mechanism. To prevent a kickback from the solenoid from pressing the keys far enough to significantly depress the rack bar lever to contact the driven embossing mechanism, in some embodiments of assisted operation, a second, latching solenoid engages a mechanical stop that prevents the one or more keys from being pushed to the larger first predetermined distance. Accordingly, with electrical power, the user may supply a lesser amount of force and still fully emboss Braille cells, while without electrical power, the Braille writer remains fully operational. Different embodiments of the mechanical stop and latching solenoid are discussed below in connection with FIGS. 2A-2C and 4A-4F.

Figure 2A:
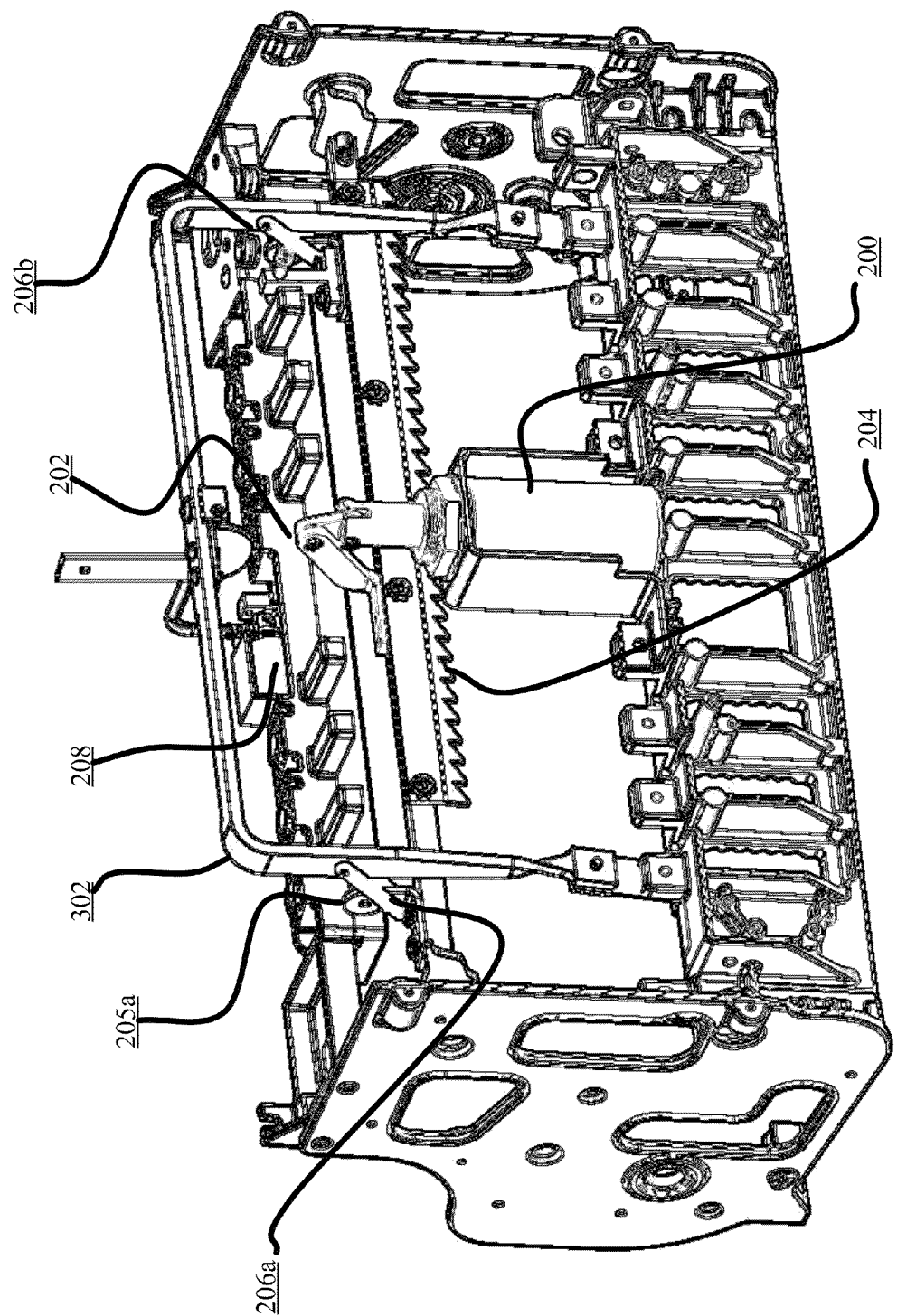
FIG. 2A is a perspective cutaway view of an embodiment of a mechanical Braille writer with an electrical assist mechanism.
Figure 2B:
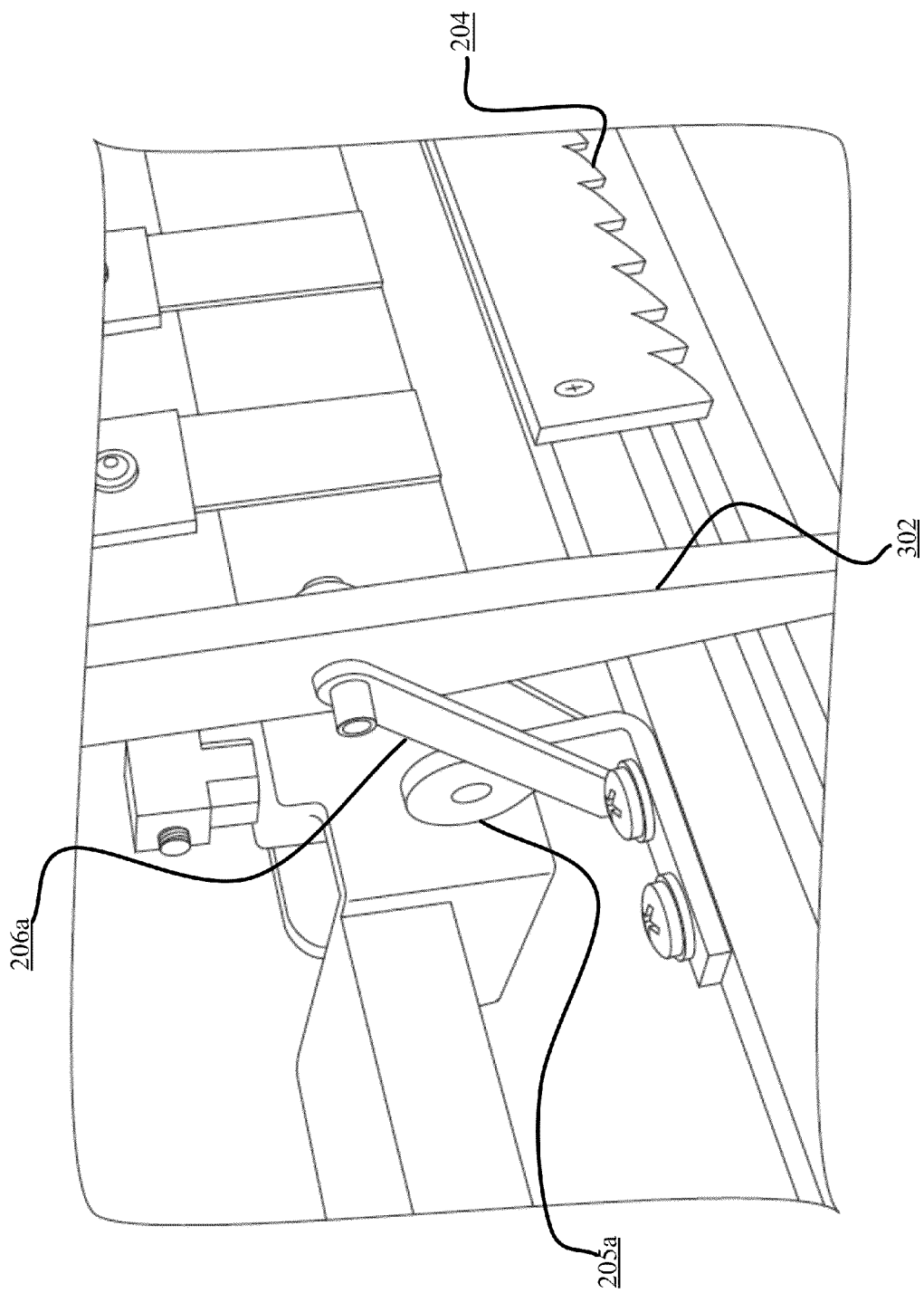
FIG. 2B is a magnified view of one embodiment of a linkage as shown in FIG. 2A.
Figure 2C:
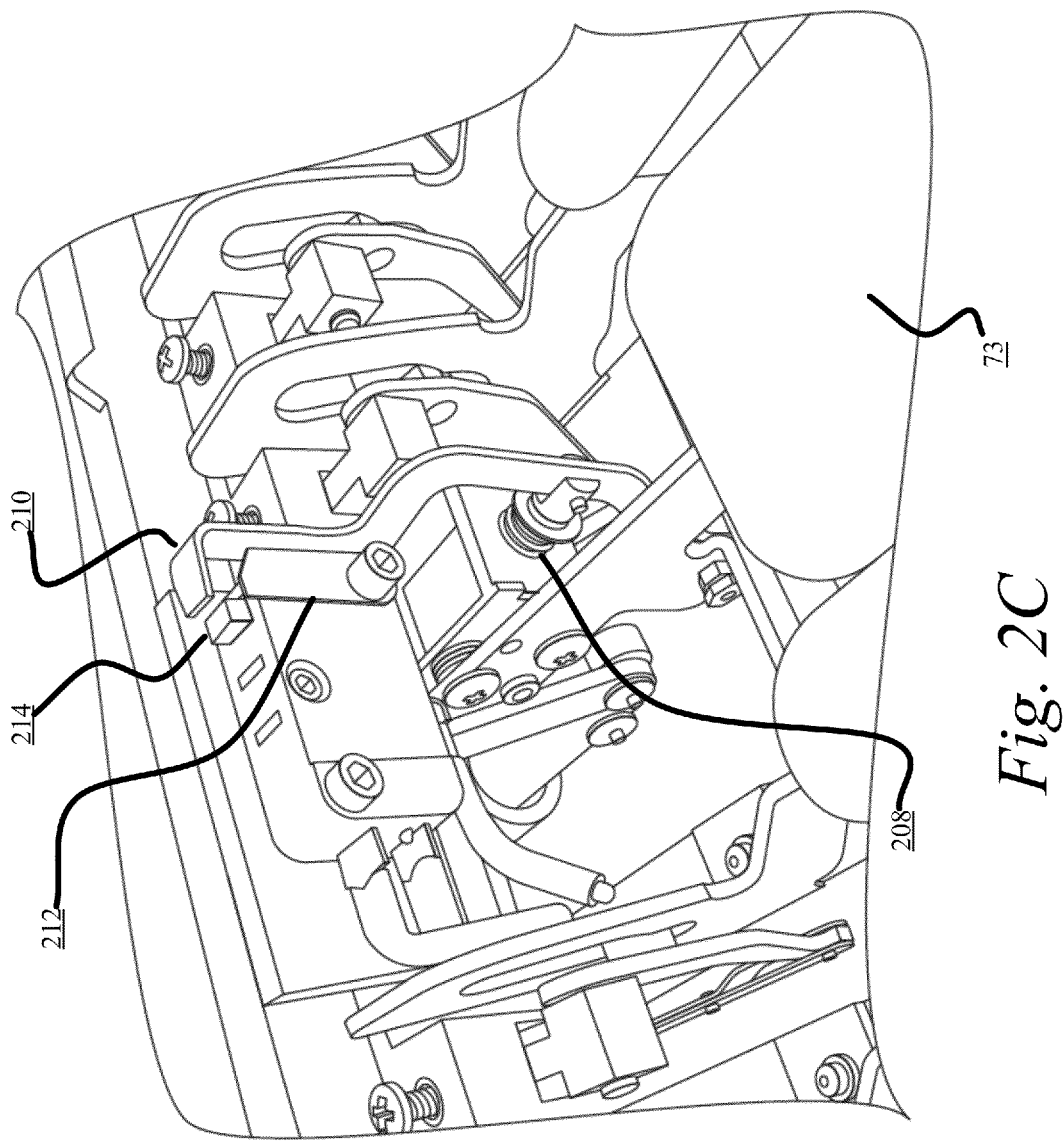
FIG. 2C is a perspective view of one embodiment of a mechanical stop as shown in FIG. 2A.

Referring now to the embodiment illustrated in FIGS. 2A-2C and first to FIG. 2A, shown is a perspective cutaway view of an embodiment of a mechanical Braille writer with an electrical assist mechanism. In brief overview, a main solenoid 200 is connected via an arm 202 to carriage spacer 204. Carriage spacer 204 is connected via sliding levers 206a and 206b to the rack bar lever 302 via rack bar linkages 205a and 205b. In one embodiment, latching solenoid 208 is placed to move a mechanical stop into position when energized.

Still referring to FIG. 2A and in more detail, in some embodiments of a Braille writer in unpowered operation, depressing one or more embossing keys or the space bar forces the rack bar lever 302 downwards. In some embodiments, rack bar lever 302 may comprise a lever, beam, or other structure for translating downward motion of one or more embossing keys and/or space bar into force for embossing a Braille cell by an embossing mechanism. Rack bar lever 302 may further provide a rotational force for a rack bar, discussed in more detail below. In some embodiments, rack bar lever 302 may not provide direct force to emboss the Braille cell, but rather may provide force to rotate or translate an embossing mechanism via a second lever. As shown, in some embodiments, rack bar lever 302 may comprise a U-shape with a central portion and two arms. The rack bar lever 302 may be fixed at the end of the two arms, allowing the central portion to swing as force is applied. In other embodiments, rack bar lever 302 may be attached via springs, hinges, or other means, such that arms are not required. In still other embodiments, rack bar lever 302 may be L-shaped, T-shaped, H-shaped, or any other form to capture downward force from keys and apply the force to a rack bar or other portion of an embossing mechanism.

In some embodiments, rack bar lever 302 pulls, via sliding levers 206a-206b and rack bar linkages 205a-205b, the horizontal bar attached to carriage spacer 204. In some embodiments, sliding levers 206a and 206b, referred to generally as sliding lever(s) 206 or first linkage(s), may comprise two arms or sides, a pin attaching the two arms to a rack bar lever 302, and a pin or roller, attaching the two arms at their upper ends. Sliding levers 206 may freely rotate around the lower pin, and upper roller may allow the levers to apply force to rack bar linkages 205 regardless of angle without slipping.

Rack bar linkages 205a and 205b, referred to generally as rack bar linkage(s) 205 or second linkage(s), may comprise L-shaped or T-shaped metal brackets connected to the horizontal bar attached to carriage spacer 204, with a profile allowing the rack bar linkages to engage or be engaged by rollers of sliding levers 206.

In other embodiments, sliding levers 206 and rack bar linkages 205 may comprise matching hooks, a plunger and tube of a pneumatic linkage, chains, a T and eye-ring linkage, or any other type and form of linkages for transferring force from rack bar lever 302 to the horizontal bar attached to carriage spacer 204. When the rack bar lever 302 is in a default, non-depressed position, sliding levers 206 and rack bar linkages 205 may be spaced by a first predetermined distance. This first predetermined distance may allow the rack bar lever 302 to be depressed to a first predetermined position, less than a second predetermined position required for manual or unassisted embossing, without the sliding levers 206 contacting the rack bar linkages 205. In electrical assisted mode, main solenoid 200 may be engaged when the rack bar lever 302 is in this first predetermined position, and due to the spacing, vibrations from the solenoid will not be coupled through sliding levers to the rack bar lever, keys, and a user's fingers. In unassisted mode, when the user depresses the keys and rack bar lever to the second predetermined position, the sliding levers and linkages may engage, allowing transfer of force from the lever to the embossing mechanism and embossing the Braille cell. For example, in another embodiment using chains as linkages, the chains may be slack when the keys are at a default position or to just a first predetermined position, but may be taut and transfer force to the rack bar when the keys are moved beyond the first predetermined position.

In some embodiments, the bar attached to carriage spacer 204 is held via rotatable pivots at the ends, allowing the bar to slightly rotate. Carriage spacer 204 may be fixed to the bar at a lateral displacement from the pivot axis, such that rotating the bar causes carriage spacer 204 to swing through an arc rather than merely rotating. In one embodiment, the teeth of carriage spacer 204 are at separations equal to the width of a Braille cell, and act as a mechanical escapement for the embossing mechanism, allowing it to advance or retreat precisely one Braille cell at a time. The spacing may be dependent on the size of Braille to be embossed.

As discussed above, when powered, in some embodiments, main solenoid 200 rotates the horizontal bar attached to carriage spacer 204 directly via arm 202. Referring briefly to the magnified view of one embodiment of a linkage shown in FIG. 2B, and as discussed above, sliding levers 206a and 206b may be pinned at one end to the rack bar lever 302, but slidingly engage hooks, brackets, or rack bar linkages 205a and 205b attached to the horizontal bar attached to carriage spacer 204. Thus, when main solenoid 200 is engaged, motion of the horizontal arm attached to carriage spacer 204 does not pull the rack bar lever 302 via levers 206a and 206b. In other embodiments, as discussed above, variations on levers 206a and 206b may be employed, including hooks, sliding pistons, prismatic joints, catches, or other features such that main solenoid 200 and the rack bar lever 302 may both apply pressure to carriage spacer 204, without main solenoid 200 moving the rack bar lever 302.

Returning to FIG. 2A, as discussed above, if a user depresses the rack bar lever 302 too far while in powered operation such that sliding levers and rack bar linkages are engaged against each other, both main solenoid 200 and the rack bar lever 302 via levers 206a and 206b may move carriage spacer 204, and accordingly, vibration from main solenoid 200 may be coupled via carriage spacer 204, levers 206a and 206b, and the rack bar lever 302 to the keys and the user's fingers. This may create an unpleasant kickback. Accordingly, in some embodiments, a second solenoid 208 may be employed to engage a mechanical stop to prevent one or more embossing keys from being fully depressed. The rack bar lever 302 may thus be depressed a first predetermined distance, such as 0.25 inches, while prevented from being depressed far enough to allow sliding levers 206 to engage linkages 205. One such embodiment is illustrated in the perspective view of one embodiment of a mechanical stop shown in FIG. 2C, while another such embodiment is illustrated in FIGS. 4A-4F.

Referring first to the embodiment illustrated in FIG. 2C, a perspective view of one embodiment of a mechanical stop is shown. In one embodiment, second solenoid 208 is connected to travel arm 210, which is connected at its lower end to the rack bar lever. Second solenoid 208 may comprise a direct current solenoid, alternating current solenoid, or hybrid solenoid. In some embodiments, second solenoid 208 may comprise a latching solenoid.

In some embodiments, travel arm 210 may comprise an arm for pressing a trigger switch when one or more keys are depressed. In some embodiments, travel arm 210 may be moved by second solenoid 208 to engage a mechanical stop or bar, preventing further travel by one or more keys. Travel arm 210 may be connected to a bar (not shown) running horizontally beneath the one or more keys, such that depressing one or more keys causes travel arm 210 to move vertically downwards. In one embodiment, travel arm 210 may slide vertically in a notch of the armature of latching solenoid 208. In a further embodiment, travel arm 210 may include a hole or cut-out portion, and the armature of latching solenoid 208 may include a pin, such that the hole and pin comprise a prismatic joint, allowing travel arm 210 to freely move vertically, while being constrained in horizontal motion.

In some embodiments, travel arm 210 may include a bent portion, catch, or other feature, while in other embodiments, travel arm 210 may be attached to a horizontal arm or catch. In these embodiments, such bent portion, arm, catch, or other feature may be positioned to engage a mechanical stop 212 when in powered operation. In unpowered operation, latching solenoid 208 may either push travel arm 210 outward past mechanical stop 212, or pull travel arm 210 inward past mechanical stop 212, depending on orientation and type of latching solenoid 208. Conversely, in powered operation, latching solenoid 208 may pull or push travel arm 210 such that it engages mechanical stop 212 when one or more keys are depressed, preventing motion of the keys farther than the predetermined distance between mechanical stop 212 and the catch, bent portion, or horizontal arm of travel arm 210. Thus, in one embodiment, when unpowered, a user may be able to press one or more embossing keys down a first predetermined distance, such as 0.75 inches, while when powered, the user may only be able to press the one or more embossing keys down a second, smaller predetermined distance, such as 0.25 inches.

Also shown in FIG. 2C is one embodiment of a trigger switch 214. Trigger switch 214 may be a mechanical switch, magnetic switch, an electrical switch employing an electrical contact, an optical sensor, a Hall effect sensor, a capacitive sensor, or any other type and form of switch. When in powered operation, trigger switch 214 may control main solenoid 200. In one embodiment, the trigger switch 214 may be engaged by travel arm 210. For example, in one such embodiment, trigger switch 214 may be a mechanical switch, and when travel arm 210 is positioned by latching solenoid 208 for powered operation, trigger switch 214 may be depressed by travel arm 210 or an arm connected to travel arm 210. Because it may reduce wear on a mechanical switch to refrain from pressing it during unpowered operation, in another such embodiment, when travel arm 210 is positioned for unpowered operation by latching solenoid 208, trigger switch 214 may not be depressed by the travel arm or an arm connected to the travel arm.

In another embodiment, trigger switch 214 may be a non-mechanical switch, such as the magnetic, optical, electric, or other switches described above. Because mechanical wear may not be an issue with these switches, a non-mechanical trigger switch 214 may be positioned such that it is triggered both in powered and unpowered operation. In one embodiment, a non-mechanical trigger switch 214 may be placed as shown in FIG. 2C and detect motion of travel arm 210. In other embodiments, a non-mechanical trigger switch 214 may be placed elsewhere, such as below the one or more embossing keys or the space key, or alongside another portion of travel arm 210. In yet other embodiments, a plurality of trigger switches 214 may be employed, such as one for each key, and may be connected in parallel to control main solenoid 200.

Figure 3A:
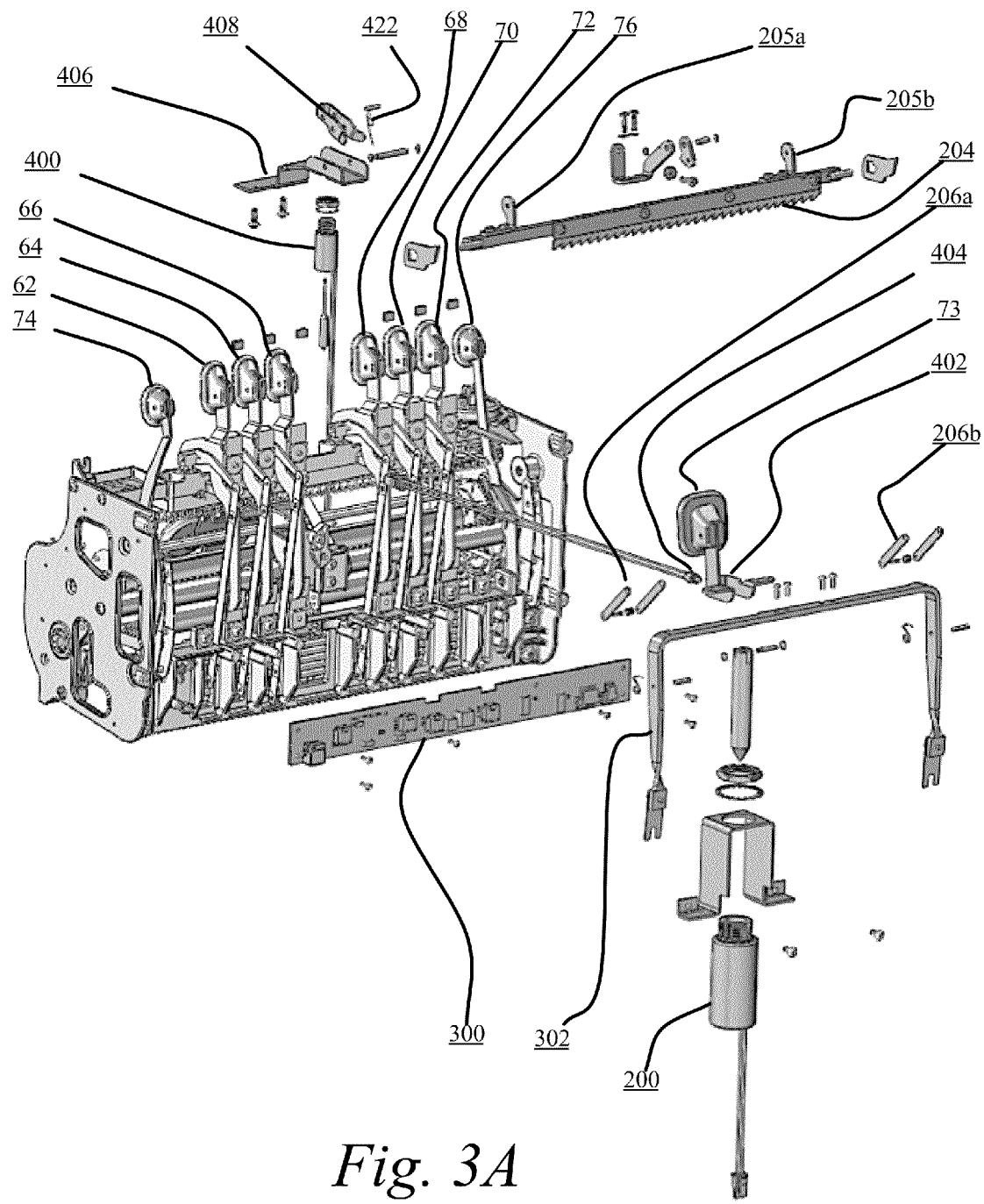
FIG. 3A is an exploded view of an embodiment of a mechanical Braille writer with an electrical assist mechanism.
Figure 3B:
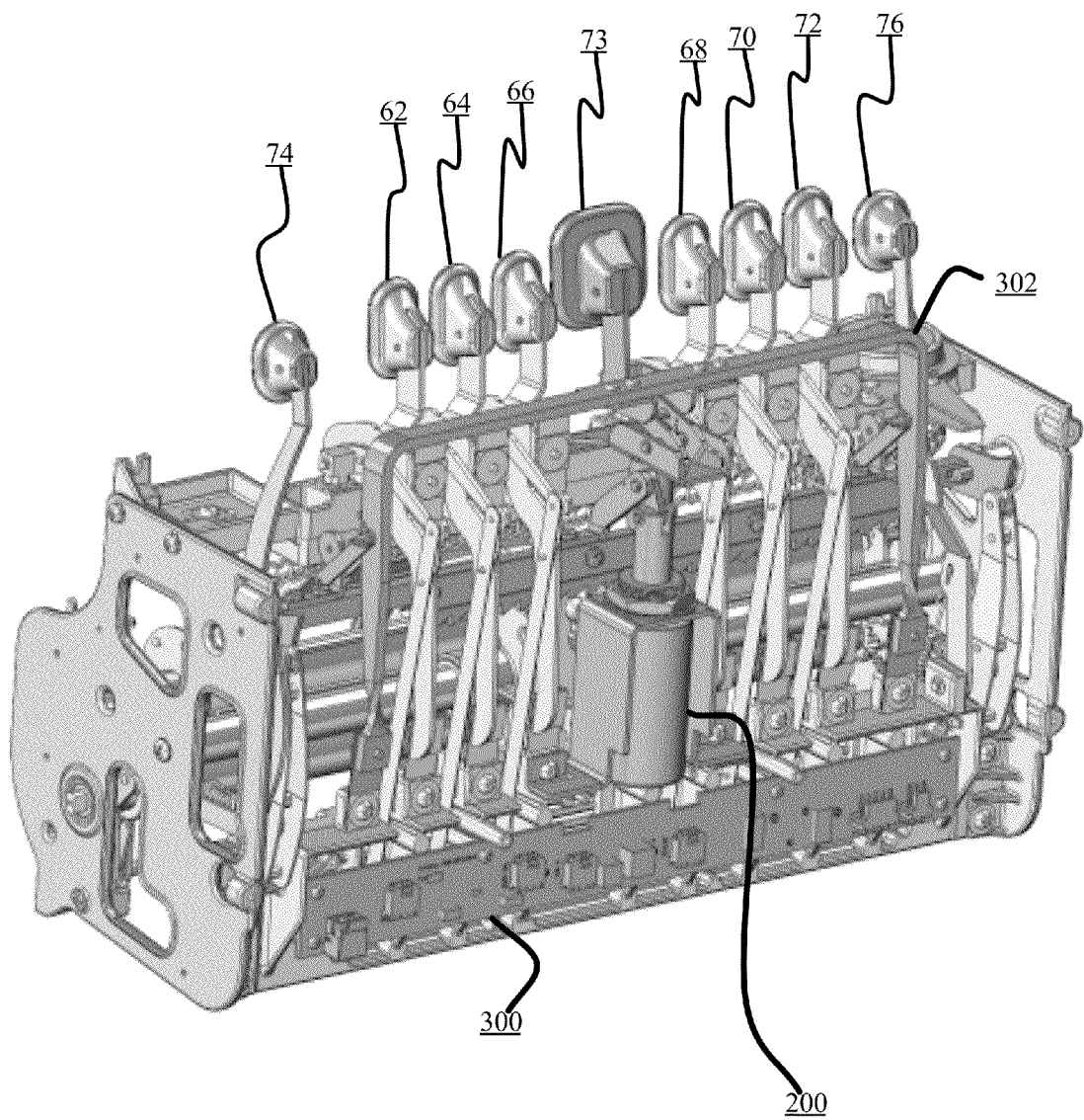
FIG. 3B is a perspective view of an embodiment of a mechanical Braille writer having an electrical assist mechanism.

Referring now to FIGS. 3A and 3B, illustrated are exploded and perspective views, respectively, of an embodiment of a mechanical Braille writer with an electrical assist mechanism. Referring first to FIG. 3A, as discussed above, rack bar lever 302 may be connected to sliding levers 206a and 206b, which are placed to respectively engage rack bar linkages 205a, 205b attached to carriage spacer 204. Space key 73 is attached to space key lever 402, which is fixed at its lower end to rack bar lever 302, discussed in more detail below. Depression of space key 73, in mechanical or unassisted mode, causes space key lever 402 to depress rack bar lever 302, as discussed above. Mechanical stop or space bar stop 408 is held out of the way of space key lever 402 via torsion return spring 422, allowing the space bar to travel the entire stroke distance.

Figure 3C:
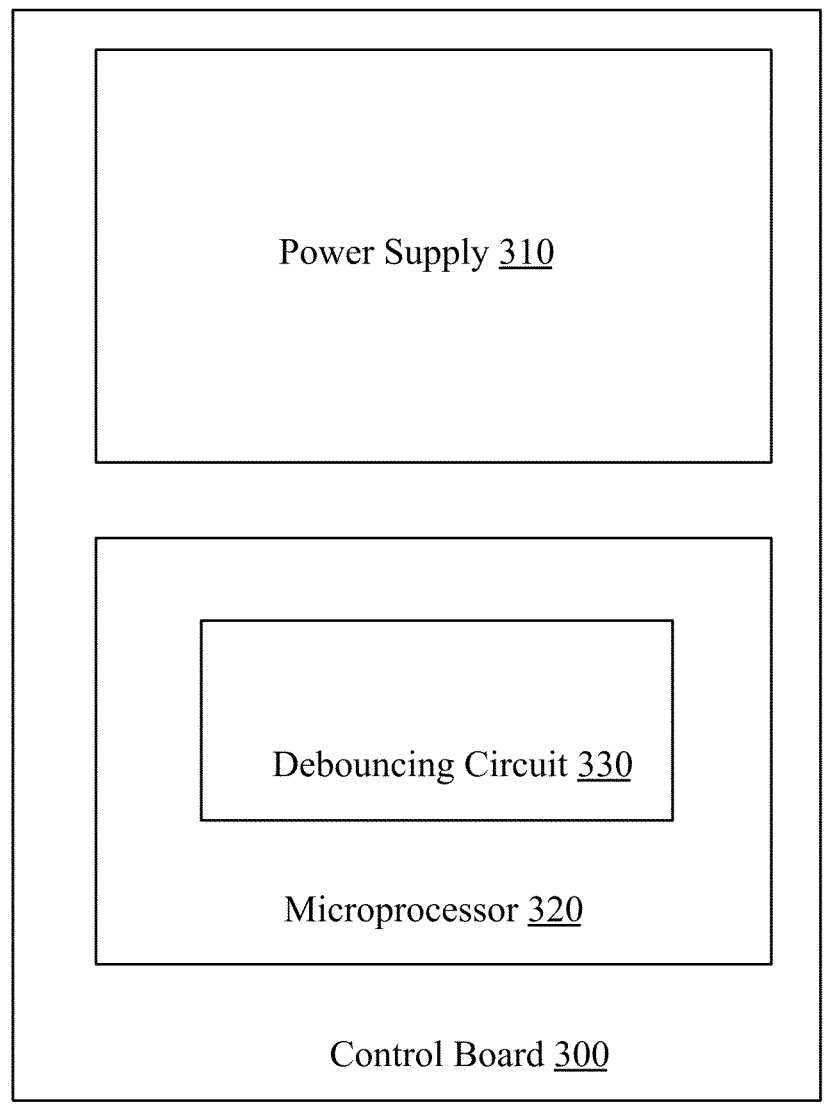
FIG. 3C is a block diagram of an embodiment of a control board for a mechanical Braille writer having an electrical assist mechanism.

In electrically assisted mode, discussed in more detail below, latching solenoid 400, engaged when power is applied, moves mechanical stop 408 into position within a U-shaped portion of space key lever 402, below switch 404 connected to space key lever 402 (illustrated in more detail and from different angles below). Depression of space key 73, in electrically assisted mode, moves space key lever 402, causing attached switch 404 to contact mechanical stop 408. Switch 404 triggers main solenoid 200, as discussed above. Solenoids 200 and 400 and switch 404 are connected to control board 300. Control board 300 (also illustrated in the block diagram of FIG. 3C) may comprise a power supply (shown as power supply 310 in FIG. 3C), transformer, rectifiers, a switch mode power supply, or any other type of power supply. In some embodiments, control board 300, switch 404 and solenoids 200 and 400 may utilize alternating current, while in other embodiments, they may use direct current or a mix of direct and alternating current. Control board 300 may, in some embodiments, comprise a programmable microprocessor (shown as microprocessor 320 in FIG. 3C) to allow for tuning. For example, in one embodiment, control board 300 may comprise a debouncing circuit (shown as debouncing circuit 330 in FIG. 3C) to provide hysteresis to operation of switch 404, preventing accidental double-triggers of switch 404 and solenoid 200. The hysteresis may be programmable, allowing tuning relative to a user's reflexes. This may allow very fast typists to not be hindered by a long debouncing delay. In some embodiments, control board 300 may provide protection against static discharge, over current, and reverse polarity problems. This may be particularly valuable when using the electrical features in areas with questionable power supplies. In some embodiments, control board 300 may further provide additional features for a Braille writer, including Braille capture and translation for visual output via a display for sighted teachers or limited-vision users, speech output via a speaker, output to a printer or computer via a serial or parallel connection. Exploded components of FIG. 3A are illustrated in assembled locations in FIG. 3B.

Figure 4A:
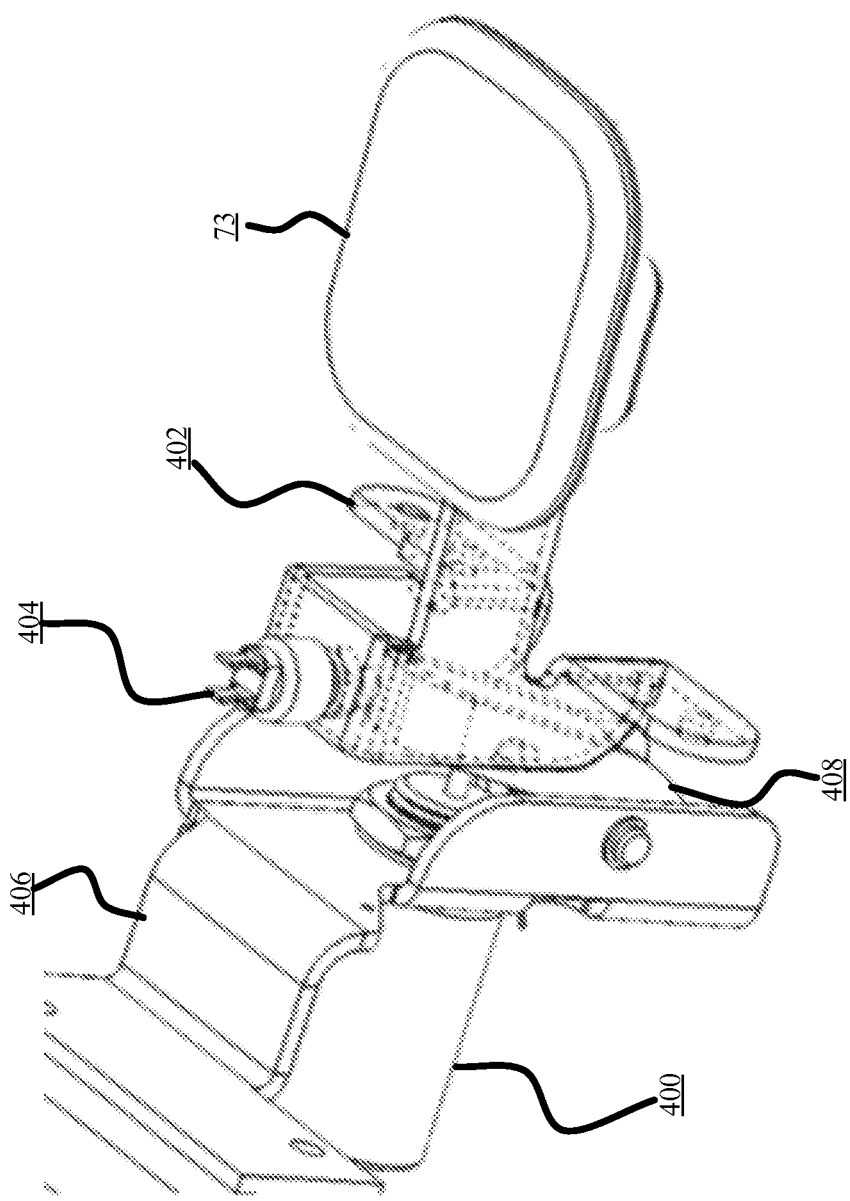
FIG. 4A is a perspective view showing another embodiment of a mechanical stop element for a mechanical Braille writer including an electrical assist mechanism.

Referring now to FIGS. 4A-4G, illustrated are other embodiments of a mechanical stop and trigger for an electrically assisted Braille mechanism. Referring first to FIG. 4A, space key 73 is attached to space key lever 402 (shown in transparent view in FIGS. 4A and 4D to show the placement of mechanical stop 408 and switch 404). Space key lever 402 is shown non-transparently in FIGS. 4B and 4C, for comparison. In some embodiments, space key lever 402 may include the U-shaped upper portion shown and attach to rack bar lever 302 on either side of space key 73, preventing torque-caused rotation when a user depresses space key 73. In other embodiments, space key lever 402 may be attached in line with the center of space key 73 to eliminate torque. Space key lever 402 may thus comprise a U-shape, T-shape, L-shape, H-shape, I-shape, or any other shape for transferring a downward force from space key 73 to rack bar lever 302, and may further contact a switch 404 and mechanical stop 408, when mechanical stop 408 is in a powered or electrical assist mode position.

As shown in FIG. 4A, latching solenoid 400 is in an energized position, pushing mechanical stop 408 to placement beneath plunger of switch 404. Switch 404 may comprise a SPST switch, a DPST switch, a SPDT switch, a DPDT switch, or any other type of switch. Switch 404 may be a momentary switch, leaf switch, capacitive switch, optical switch, magnetic switch, or any other type and form of switch.

In some embodiments, mechanical stop 408 may be attached via a pivot to solenoid mount 406 as shown. Mechanical stop 408 may rotate around this pivot to extreme positions defined by contact with solenoid mount 406 at upper or lower edges of mechanical stop 408. In other embodiments, solenoid 400 may have a defined throw, such that the mechanical stop 408 is prevented from travelling beyond the engaged position shown through braking force from solenoid 400. In still other embodiments, a latch or second solenoid may lock mechanical stop 408 in an extended position when powered.

Figure 4B:
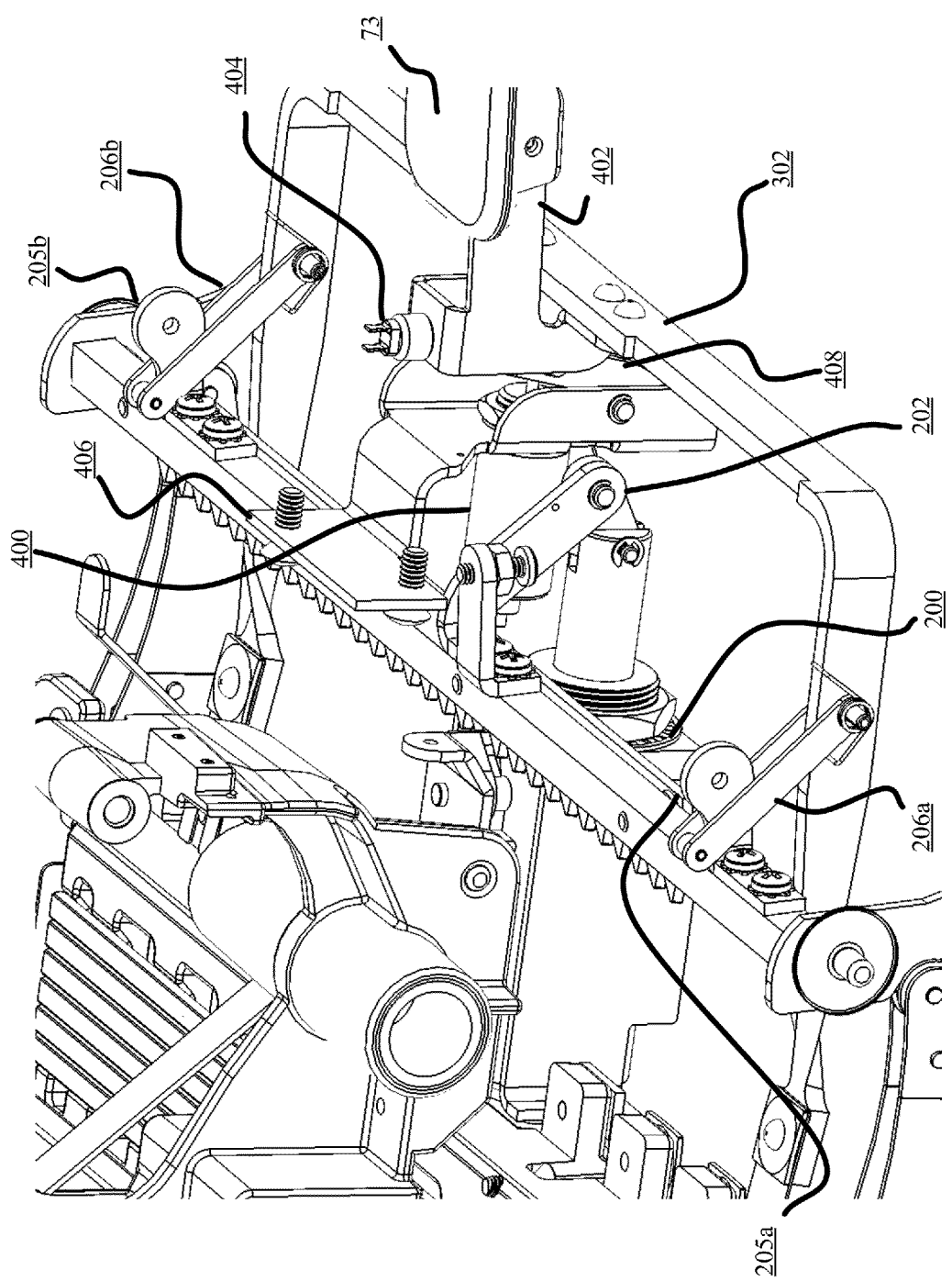
FIG. 4B is a perspective view of the mechanical stop shown in FIG. 4A as installed in a mechanical Braille writer having an electrical assist mechanism.

Referring briefly to FIG. 4B, latching solenoid 400 and components of the mechanical stop 402-408 are illustrated in assembled position relative to rack bar lever 302, sliding levers 206, rack bar linkages 205 and carriage spacer and embossing elements. In FIG. 4B, keys 62-72 and 74-76 and associated levers have been removed for provide clear view of main solenoid 200 and lever 202, and latching solenoid 400 and mechanical stop components 402-408. Similarly, the chain support attached to solenoid mount 406 has been removed in FIG. 4B for clarity. For comparison, FIG. 4C includes the chain support attached to solenoid mount 406, illustrating position and attachment of these components in many embodiments.

Figure 4D:
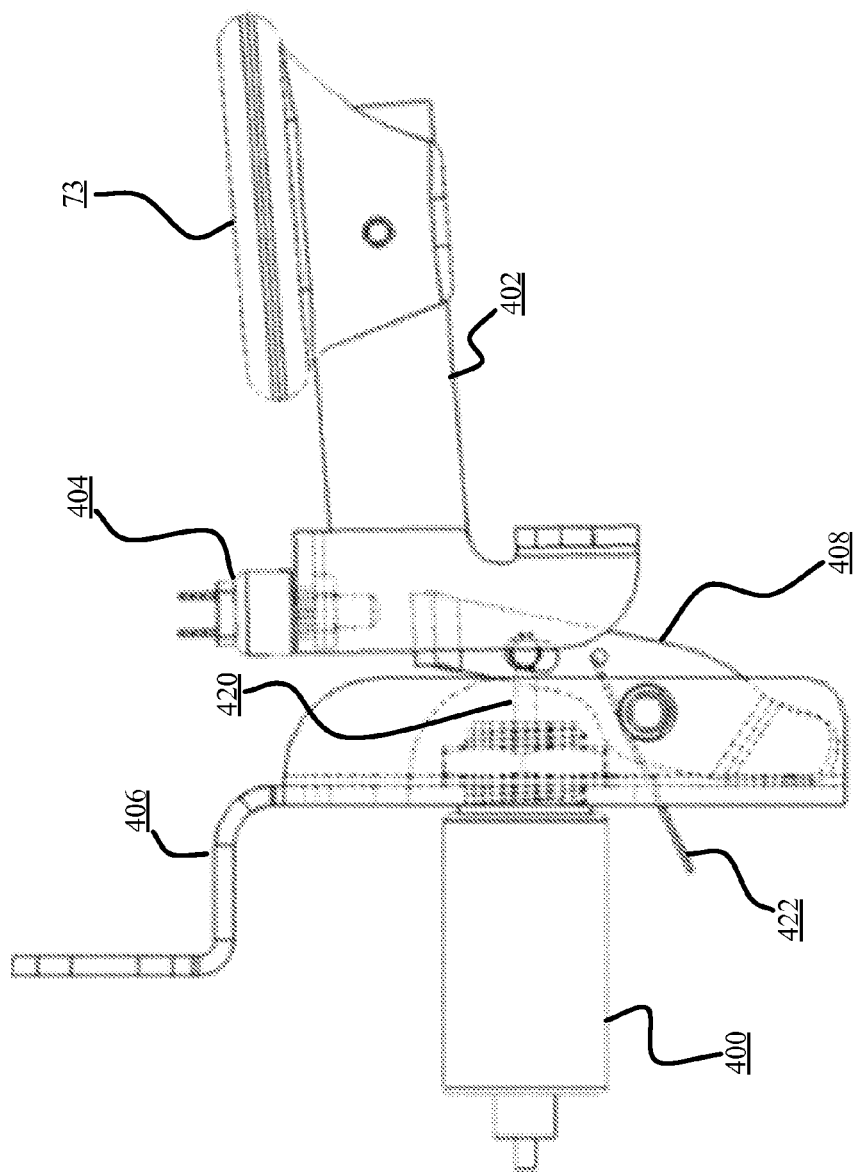
FIGS. 4D and 4E are side views of the mechanical stop shown in FIG. 4A.
Figure 4E:
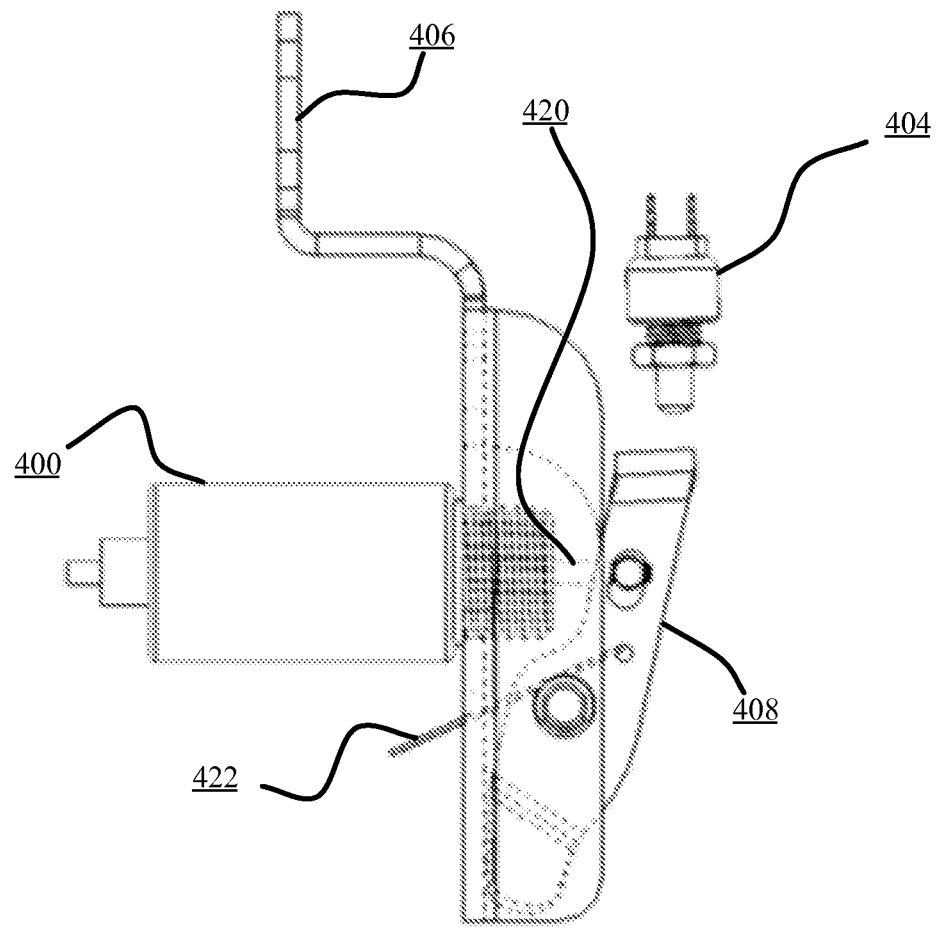

Referring now to FIGS. 4D and 4E, and in brief overview, the mechanical stop and trigger of FIG. 4A are shown in side views. In FIG. 4D, space key lever 402 and solenoid mount 406 are illustrated transparently to provide view of solenoid, switch, and mechanical stop placement. In FIG. 4E, space key 73 and space key lever 402 are removed, for comparison.

Figure 4F:
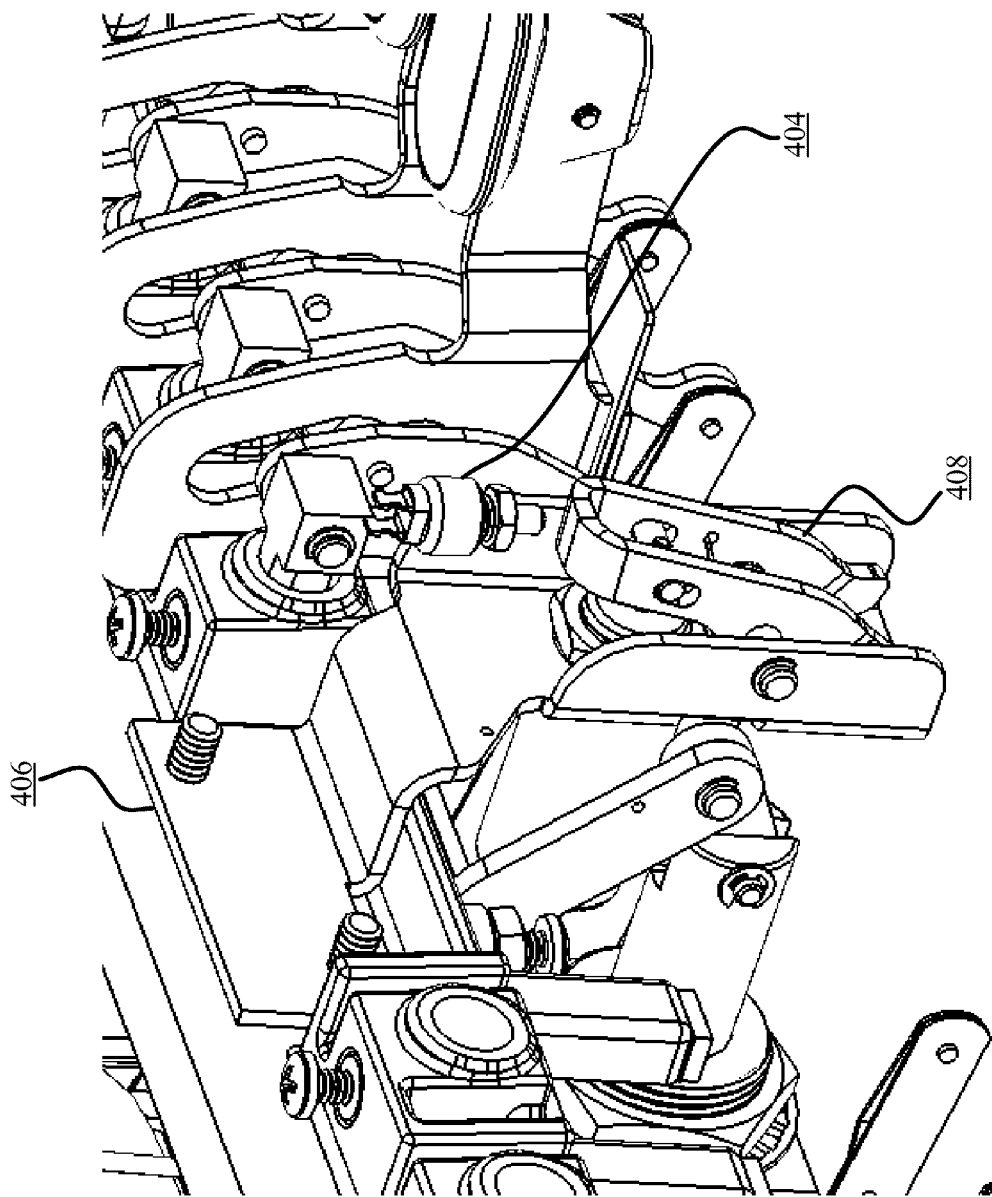
FIG. 4F is a perspective view of the mechanical stop shown in FIG. 4A when installed in a mechanical Braille writer having an electrical assist mechanism.

FIG. 4F illustrates the mechanical stop and trigger of FIG. 4D from a perspective view, with space key 73 and space key lever 402 and keys 62-66 similarly removed for clarity. As shown, the mechanical stop may comprise a U-shape, or may comprise a T-shape, I-shape, O-shape, or any other shape capable of being moved between a disarmed or manual mode position, and an engaged or electric assist mode position to prevent motion of space key lever 402 beyond a first predetermined distance.

Referring back to FIG. 4D, and in greater detail, solenoid 400 is attached via T-shaped plunger 420 to mechanical stop 408. Although shown as a T-shaped plunger or armature, in many embodiments, solenoid 400 may be attached to mechanical stop 408 directly, indirectly, or via one or more linkages. When solenoid 400 is energized, plunger 420 is extended and mechanical stop 408 moves to position beneath switch 404 as shown. In some embodiments, mechanical stop 408 pivots around its attachment points to solenoid mount 406, and the lower portion of mechanical stop 408 contacts solenoid mount 406 below the pivot, preventing further travel. In other embodiments, mechanical stop 408 is prevented from traveling further by contact against other components or brakes, or by solenoid 400 having a fixed throw. When solenoid 400 is not energized, torsion spring 422 returns mechanical stop 408 to a disengaged position, allowing space key 73 and space key lever 402 to be fully depressed to mechanically emboss a Braille cell. In some embodiments, torsion spring 422 may return mechanical stop to a position with the top portion of mechanical stop 408 against or close to solenoid mount 406. In other embodiments, torsion spring 422 may return mechanical stop to any other position that allows full travel of space key lever 402.

Figure 4G:
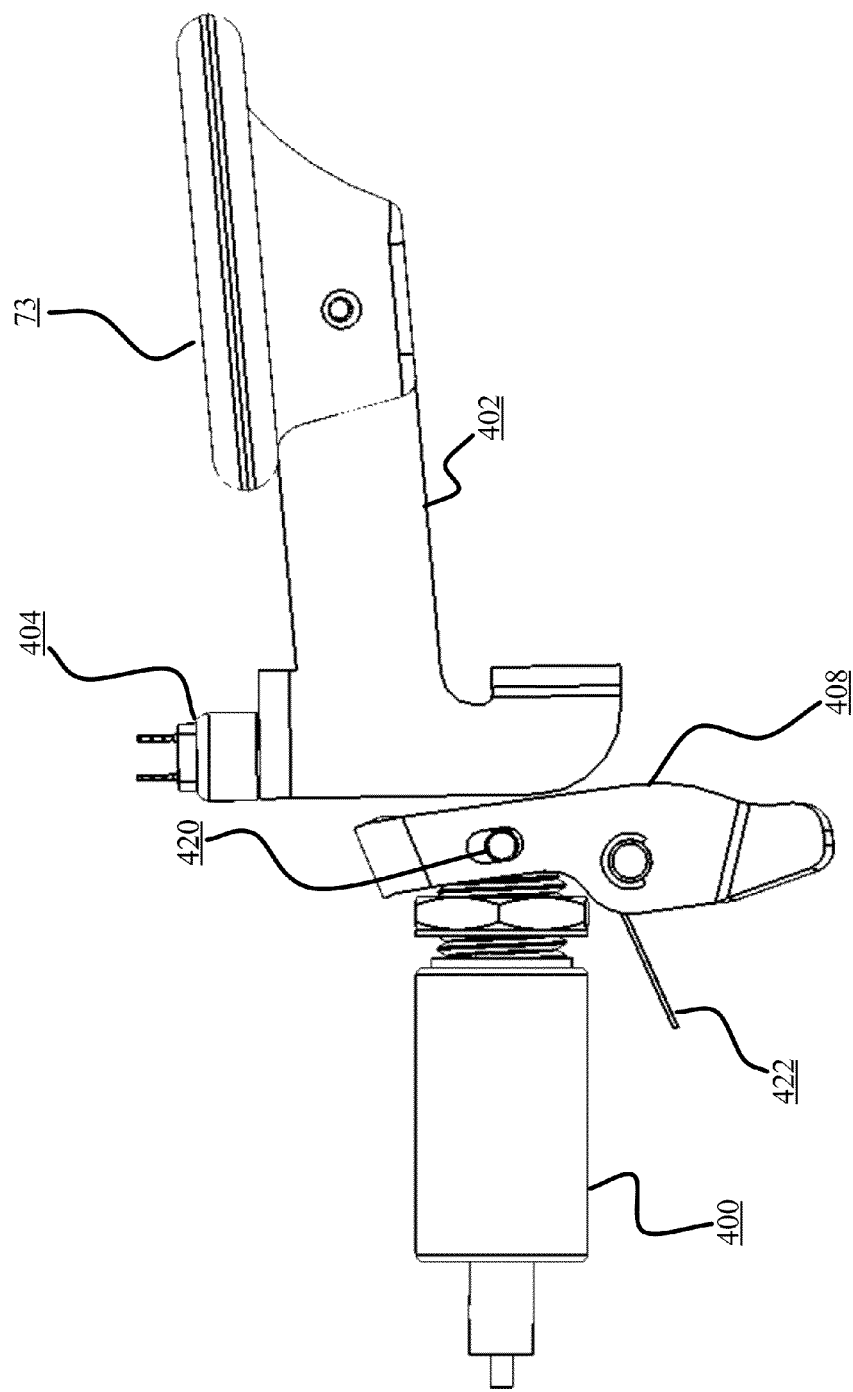
FIG. 4G is a side view of the mechanical stop shown in FIG. 4A when installed in a mechanical Braille writer having an electrical assist mechanism.

Referring now to FIG. 4G, this unassisted or mechanical mode is illustrated, with solenoid mount 406 removed for clarity. As shown, mechanical stop 408 is rotated out of position from within space key lever 402. Depressing the space key 73 in this position will not engage switch 404 against mechanical stop 408, reducing wear on the mechanical switch, as well as allowing space key 73 to fully depress beyond where mechanical stop would have prevented further travel. Although the embodiments illustrated in FIGS. 4A-4G are shown with a mechanical switch 404, in many embodiments, magnetic, optical, or other switches may be used, without departing from the scope of the present invention. Although switch 404 is illustrated attached to space key lever 402, in some embodiments, switch 404 may be attached to mechanical stop 408 and depressed by a portion of space key lever 402. In still other embodiments, switch 404 may be attached elsewhere, such as on solenoid mount 406, and space key lever 402 may include an extension or arm to engage switch 404 when space key 73 is depressed.

Figure 5:
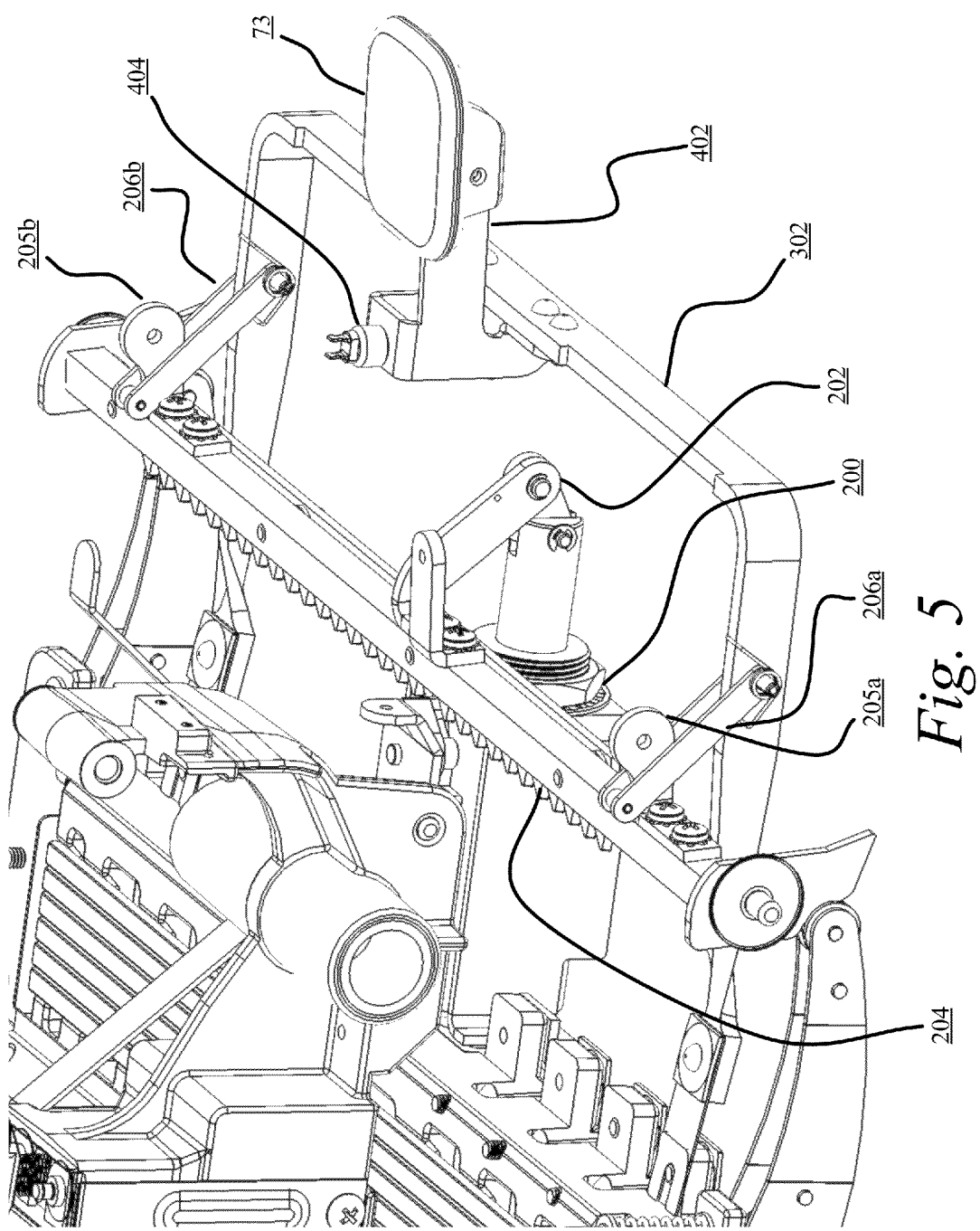
FIG. 5 is a perspective view of an embodiment of a mechanical Braille writer having an electrical assist mechanism.

Referring now to FIG. 5, illustrated is a perspective view of an embodiment of a mechanical Braille writer having an electrical assist mechanism. Additional keys and components, including the mechanical stop discussed above, have been removed for clarity. As shown, in some embodiments, the rack bar attached to carriage spacer 204, arm 202, and rack bar linkages 205a and 205b is attached at its ends to pivots, allowing the carriage spacer 204 to rotate and move through an arc as the rack bar is rotated, either mechanically via linkages 205 or via main solenoid 200 and arm 202. Rack bar lever 302 is attached to space key lever 402, and sliding levers 206a and 206b. Sliding levers 206a and 206b may each include a roller at their upper end, forming an attachment point for each of the two halves of the sliding lever, although, as discussed above, different combinations of linkages 205 and 206 may be used without departing from the scope of the present disclosure. When rack bar lever 302 is depressed in mechanical mode beyond a first predetermined position such that the rollers or linkages move beyond a first predetermined distance, the rollers or linkages may engage rack bar linkages 205a and 205b. As shown, in many embodiments, when no keys are depressed, there is a gap between the rollers of sliding levers 206a and 206b and rack bar linkages 205a and 205b. This gap allows rack bar lever to be slightly depressed in electrically-assisted mode, engaging switch 404 against a mechanical stop as discussed above, without the rollers contacting the linkages. Thus, when main solenoid 200 is engaged, vibration is not coupled through the linkages to the sliding levers, rack bar lever, space key lever, and space key to the user's fingers. The rounded profile of rack bar linkages 205a and 205b makes up for this gap in mechanical or unassisted mode, catching the rollers of sliding levers 206a and 206b as the user presses the keys beyond the distance required for electrically-assisted mode. As discussed above, in other embodiments, different types and forms of linkages can be employed, wherein force is not transmitted from the rack bar lever to the rack bar when a user depresses a key only a first predetermined distance, but force is transmitted when the user depresses the key to at least a second predetermined distance, greater than the first predetermined distance.

Figure 6A:
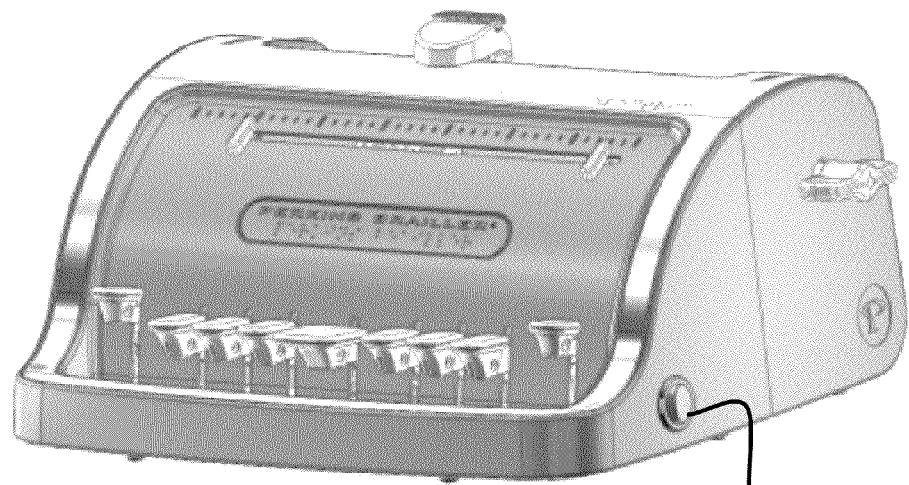
FIGS. 6A-6B are perspective and back views, respectively, of an embodiment of a mechanical Braille writer with an electrical assist mechanism.
Figure 6B:
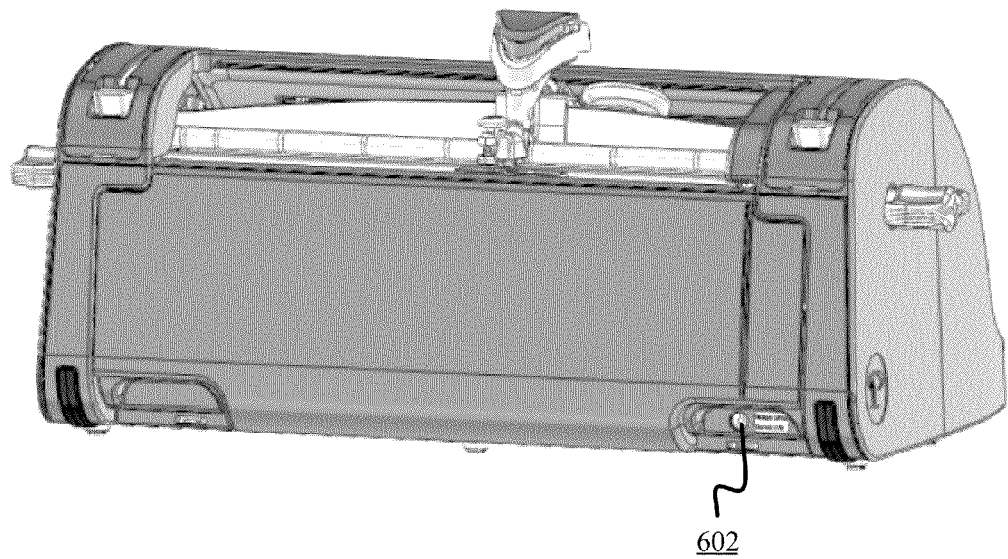

Referring briefly to FIGS. 6A and 6B, illustrated are perspective and back views, respectively, of an embodiment of a mechanical Braille writer with an electrical assist mechanism. In some embodiments, a power switch 600 may be fixed on the chassis of the writer. Power may be provided through a port 602, which may be similarly fixed on the chassis of the writer. In the embodiment shown, port 602 may be part of a control board or power supply board 300, as discussed above. As discussed above, internal components of the electrical assist mechanism may automatically position themselves when moving between assisted and unassisted modes. Thus, if power is lost, the Braille writer will still be useable. Accordingly, power switch 600 may not be required for operation or moving to unassisted mode, but may be provided for safety reasons or for reducing power consumption when not in use.

In some embodiments, the electrical assist and/or mechanical stop systems discussed above may be provided as add-on or repair kits for modification of an existing mechanical Braille writer. For example, referring back to FIG. 3A, the exploded components may be provided in a kit for attaching to or modifying an existing Braille writer. Accordingly, electrical assist capability may be easily added to mechanical Braille writers.

Having described certain embodiments of methods and systems for erasing Braille embossing, it will now become apparent to one of skill in the art that other embodiments incorporating the concepts of the invention may be used.

What is claimed:

1. An electrical assist apparatus with stopping mechanism for a mechanical Braille writer, comprising:
   an electrical assist mechanism for a mechanical Braille writer, comprising a first solenoid connected via a first linkage and second linkage to an embossing mechanism of the mechanical Braille writer, and a switch connected to the first solenoid and configured to be triggered by movement of a user-operated lever of the mechanical Braille writer beyond a first predetermined distance;
   a mechanical stop;
   a second solenoid attached to the mechanical stop and, when engaged, moving the mechanical stop to a first predetermined position to prevent the user-operated lever of the mechanical Braille writer from being moved beyond the first predetermined distance; and
   a spring attached to the mechanical stop, the spring moving the mechanical stop when the second solenoid is disengaged to a second predetermined position in which the user-operated lever is not prevented from moving beyond the first predetermined distance to a second predetermined distance.

2. The electrical assist apparatus of claim 1, wherein the switch is attached to one of the mechanical stop, the first linkage, the second linkage, and the user-operated lever, the switch triggered to engage the first solenoid to cause the embossing mechanism of the mechanical Braille writer to emboss a Braille cell.

3. The electrical assist apparatus of claim 2, wherein the switch is triggered when the user-operated lever is moved to the first predetermined distance when the first solenoid is engaged.

4. The electrical assist apparatus of claim 2, wherein the switch is not triggered when the user operated lever is moved to the first predetermined distance when the first solenoid is not engaged.

5. The electrical assist apparatus of claim 2, further comprising a debouncing circuit connected to the switch.

6. The electrical assist apparatus of claim 1, wherein the second solenoid comprises a latching solenoid.

7. The electrical assist apparatus of claim 1, wherein the first linkage is connected to the user-operated lever, and wherein the second linkage is oriented to engage the first linkage and offset from the first linkage by a third predetermined distance.

8. The electrical assist apparatus of claim 7, wherein the second linkage is moved to engage the first linkage when the user-operated lever is moved to the second predetermined distance.

9. The electrical assist apparatus of claim 7, wherein the first linkage comprises a rounded profile and the second linkage comprises a roller.

10. The electrical assist apparatus of claim 1, wherein the user-operated lever of the mechanical Braille writer is a space key.

\* \* \* \* \*